(12) United States Patent
Nakao et al.

(10) Patent No.: US 12,142,291 B2
(45) Date of Patent: Nov. 12, 2024

(54) ACTION ESTIMATION DEVICE, ACTION ESTIMATION METHOD, AND RECORDING MEDIUM

(71) Applicant: Panasonic Intellectual Property Corporation of America, Torrance, CA (US)

(72) Inventors: Taketoshi Nakao, Kyoto (JP); Toshiyuki Matsumura, Osaka (JP); Tatsumi Nagashima, Osaka (JP); Tetsuji Fuchikami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 156 days.

(21) Appl. No.: 17/845,100

(22) Filed: Jun. 21, 2022

(65) Prior Publication Data

US 2022/0328061 A1      Oct. 13, 2022

Related U.S. Application Data

(63) Continuation of application No. PCT/JP2021/026788, filed on Jul. 16, 2021.

(30) Foreign Application Priority Data

Sep. 8, 2020      (JP) .................................. 2020-150736

(51) Int. Cl.
  *G10L 15/16*      (2006.01)
  *G10L 25/30*      (2013.01)
  *G10L 25/51*      (2013.01)
(52) U.S. Cl.
  CPC .............. *G10L 25/30* (2013.01); *G10L 25/51* (2013.01); *G10L 15/16* (2013.01)

(58) Field of Classification Search
  CPC ......... G10L 25/30; G10L 25/51; G10L 15/16; G10L 15/22; G06N 3/08
  (Continued)

(56) References Cited

U.S. PATENT DOCUMENTS 10,795,018 B1 * 10/2020 Koteshwara ........... H04R 1/406
11,771,372 B2 * 10/2023 Voix ...................... G06F 18/217
                                                        704/200

(Continued)

FOREIGN PATENT DOCUMENTS

JP        2011-237865         11/2011
JP          5116699            1/2013
(Continued)

OTHER PUBLICATIONS

International Search Report issued Sep. 21, 2021 in International (PCT) Application No. PCT/JP2021/026788.

*Primary Examiner* — Disler Paul
(74) *Attorney, Agent, or Firm* — Wenderoth, Lind & Ponack, L.L.P.

(57) ABSTRACT

An action estimation device includes: an obtainer that obtains sound information pertaining to an inaudible sound, the inaudible sound being a sound in an ultrasonic band collected by a sound collector; and an estimator that estimates an output result, obtained by inputting the sound information obtained by the obtainer into a trained model indicating a relationship between the sound information and action information pertaining to an action of a person, as the action information of the person.

11 Claims, 16 Drawing Sheets

(58) Field of Classification Search
USPC .................................... 381/56, 91–92, 122
See application file for complete search history.

(56) References Cited

U.S. PATENT DOCUMENTS

| | | | |
|---|---|---|---|
| 2010/0127878 A1 | 5/2010 | Wang et al. | |
| 2015/0356849 A1 | 12/2015 | Ishii et al. | |
| 2018/0137735 A1 | 5/2018 | Matsuoka et al. | |
| 2019/0333367 A1* | 10/2019 | Shimizu | G06F 3/017 |
| 2020/0160218 A1 | 5/2020 | Itakura et al. | |

FOREIGN PATENT DOCUMENTS

| | | |
|---|---|---|
| JP | 2018-92453 | 6/2018 |
| JP | 2019-95517 | 6/2019 |
| JP | 2020-86023 | 6/2020 |
| WO | 2014/132340 | 9/2014 |
| WO | 2017/002219 | 1/2017 |
| WO | 2017/217548 | 12/2017 |

* cited by examiner

| Location information | Sound information | Action information |
|---|---|---|
| Dressing room | Cloth rustling | Removing clothes |
| Near closet | Cloth rustling | Changing clothes |
| Bed | Cloth rustling | Going to sleep, waking up |
| Washroom | Running water | Washing hands |
| Living room | Running water | Eating/drinking |
| Kitchen | Running water | Washing dishes |
| ... | ... | ... |

FIG. 15

| Time slot | (A) Number of action estimations | | | (B) Pre-optimization sound collection frequency | | | (C1) Post-optimization sound collection frequency | | | |
|---|---|---|---|---|---|---|---|---|---|---|
| | Living room | Kitchen | Washroom | Living room | Kitchen | Washroom | Living room | Kitchen | Washroom | Total |
| 0 | 0 | 0 | 0 | 10 | 10 | 10 | 3 | 3 | 3 | 9 |
| 1 | 0 | 0 | 0 | 10 | 10 | 10 | 3 | 3 | 3 | 9 |
| 2 | 1 | 0 | 0 | 10 | 10 | 10 | 4 | 3 | 3 | 10 |
| 3 | 0 | 0 | 0 | 10 | 10 | 10 | 3 | 3 | 3 | 9 |
| 4 | 0 | 0 | 0 | 10 | 10 | 10 | 3 | 3 | 3 | 9 |
| 5 | 5 | 2 | 2 | 10 | 10 | 10 | 8 | 5 | 5 | 18 |
| 6 | 8 | 8 | 8 | 10 | 10 | 10 | 11 | 11 | 11 | 33 |
| 7 | 10 | 10 | 10 | 10 | 10 | 10 | 13 | 13 | 13 | 39 |
| 8 | 8 | 8 | 4 | 10 | 10 | 10 | 11 | 11 | 7 | 29 |
| 9 | 7 | 7 | 2 | 10 | 10 | 10 | 10 | 10 | 5 | 25 |
| 10 | 6 | 4 | 1 | 10 | 10 | 10 | 9 | 7 | 4 | 20 |
| 11 | 4 | 4 | 1 | 10 | 10 | 10 | 7 | 7 | 4 | 18 |
| 12 | 4 | 4 | 1 | 10 | 10 | 10 | 7 | 7 | 4 | 18 |
| 13 | 4 | 4 | 1 | 10 | 10 | 10 | 7 | 7 | 4 | 18 |
| 14 | 3 | 2 | 1 | 10 | 10 | 10 | 6 | 5 | 4 | 15 |
| 15 | 5 | 1 | 3 | 10 | 10 | 10 | 8 | 4 | 4 | 16 |
| 16 | 6 | 4 | 3 | 10 | 10 | 10 | 9 | 7 | 6 | 22 |
| 17 | 8 | 6 | 2 | 10 | 10 | 10 | 11 | 9 | 5 | 25 |
| 18 | 10 | 10 | 4 | 10 | 10 | 10 | 13 | 13 | 7 | 33 |
| 19 | 10 | 10 | 6 | 10 | 10 | 10 | 13 | 13 | 9 | 35 |
| 20 | 10 | 10 | 8 | 10 | 10 | 10 | 13 | 13 | 11 | 37 |
| 21 | 10 | 8 | 10 | 10 | 10 | 10 | 13 | 11 | 13 | 37 |
| 22 | 8 | 6 | 4 | 10 | 10 | 10 | 11 | 9 | 7 | 27 |
| 23 | 6 | 4 | 0 | 10 | 10 | 10 | 9 | 7 | 3 | 19 |

FIG. 16

| Time slot | (A) Number of action estimations | | | (B) Pre-optimization sound collection frequency | | | (C2) Post-optimization sound collection frequency | | | |
|---|---|---|---|---|---|---|---|---|---|---|
| | Living room | Kitchen | Washroom | Living room | Kitchen | Washroom | Living room | Kitchen | Washroom | Total |
| 0 | 0 | 0 | 0 | 10 | 10 | 10 | 3 | 3 | 3 | 9 |
| 1 | 0 | 0 | 0 | 10 | 10 | 10 | 3 | 3 | 3 | 9 |
| 2 | 1 | 0 | 0 | 10 | 10 | 10 | 3 | 3 | 3 | 9 |
| 3 | 0 | 0 | 0 | 10 | 10 | 10 | 3 | 3 | 3 | 9 |
| 4 | 0 | 0 | 0 | 10 | 10 | 10 | 3 | 3 | 3 | 9 |
| 5 | 5 | 2 | 2 | 10 | 10 | 10 | 4 | 4 | 4 | 12 |
| 6 | 8 | 8 | 8 | 10 | 10 | 10 | 10 | 10 | 10 | 30 |
| 7 | 10 | 10 | 10 | 10 | 10 | 10 | 10 | 10 | 10 | 30 |
| 8 | 8 | 8 | 4 | 10 | 10 | 10 | 12 | 12 | 6 | 30 |
| 9 | 7 | 7 | 2 | 10 | 10 | 10 | 4 | 4 | 4 | 12 |
| 10 | 6 | 4 | 1 | 10 | 10 | 10 | 4 | 4 | 4 | 12 |
| 11 | 4 | 4 | 1 | 10 | 10 | 10 | 4 | 4 | 4 | 12 |
| 12 | 4 | 4 | 1 | 10 | 10 | 10 | 4 | 4 | 4 | 12 |
| 13 | 4 | 4 | 1 | 10 | 10 | 10 | 4 | 4 | 4 | 12 |
| 14 | 3 | 2 | 1 | 10 | 10 | 10 | 4 | 4 | 4 | 12 |
| 15 | 5 | 1 | 3 | 10 | 10 | 10 | 4 | 4 | 4 | 12 |
| 16 | 6 | 4 | 2 | 10 | 10 | 10 | 4 | 4 | 4 | 12 |
| 17 | 8 | 6 | 4 | 10 | 10 | 10 | 4 | 4 | 4 | 12 |
| 18 | 10 | 10 | 8 | 10 | 10 | 10 | 12 | 12 | 5 | 29 |
| 19 | 10 | 10 | 8 | 10 | 10 | 10 | 12 | 12 | 6 | 30 |
| 20 | 10 | 10 | 10 | 10 | 10 | 10 | 11 | 11 | 8 | 30 |
| 21 | 10 | 8 | 4 | 10 | 10 | 10 | 11 | 8 | 11 | 30 |
| 22 | 8 | 6 | 4 | 10 | 10 | 10 | 4 | 4 | 4 | 12 |
| 23 | 6 | 4 | 0 | 10 | 10 | 10 | 4 | 4 | 4 | 12 |

ACTION ESTIMATION DEVICE, ACTION ESTIMATION METHOD, AND RECORDING MEDIUM

CROSS REFERENCE TO RELATED APPLICATIONS

This is a continuation application of PCT International Application No. PCT/JP2021/026788 filed on Jul. 16, 2021, designating the United States of America, which is based on and claims priority of Japanese Patent Application No. 2020-150736 filed on Sep. 8, 2020. The entire disclosures of the above-identified applications, including the specifications, drawings and claims are incorporated herein by reference in their entirety.

FIELD

The present disclosure relates to an action estimation device, an action estimation method, and a recording medium.

BACKGROUND

Recent years have seen demand to provide various services to users based on their daily lives by estimating their actions (also called "action information" hereinafter) based on everyday sounds that occur in the users' residences.

For example, PTL 1 discloses a technique in which sound sources of sounds classified as real environment sounds are identified based on learning results from a database that has learned features and directions of television sounds and features of real environment sounds from sounds detected in the residence of a user as well as analysis results from an analyzer that analyzes the features and sound source directions of the detected sounds, and actions of the user in the residence are estimated based on the identified sound sources.

CITATION LIST

Patent Literature

PTL 1: Japanese Unexamined Patent Application Publication No. 2019-095517

SUMMARY

Technical Problem

However, both the real environment sounds and the television sounds collected are audible sounds which can be perceived by human hearing, and thus the technique described in PTL 1 is susceptible to the influence of noise from a variety of everyday sounds, making it difficult to say that the technique can accurately estimate the actions of users.

Accordingly, the present disclosure provides an action estimation device, an action estimation method, and a recording medium capable of accurately estimating the actions of a person.

Solution to Problem

An action estimation device according to one aspect of the present disclosure includes: an obtainer that obtains sound information pertaining to an inaudible sound, the inaudible sound being a sound in an ultrasonic band collected by a sound collector; and an estimator that estimates an output result, obtained by inputting the sound information obtained by the obtainer into a trained model indicating a relationship between the sound information and action information pertaining to an action of a person, as the action information of the person.

Advantageous Effects

According to the present disclosure, an action estimation device, an action estimation method, and a recording medium capable of accurately estimating the actions of a person can be provided,

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 15 is a diagram illustrating an example of adjusting a sound collection frequency of the action estimation device according to Embodiment 3.

FIG. 16 is a diagram illustrating another example of adjusting a sound collection frequency of the action estimation device according to Embodiment 3.

DESCRIPTION OF EMBODIMENTS

Findings Leading to Present Disclosure

Figure 1:
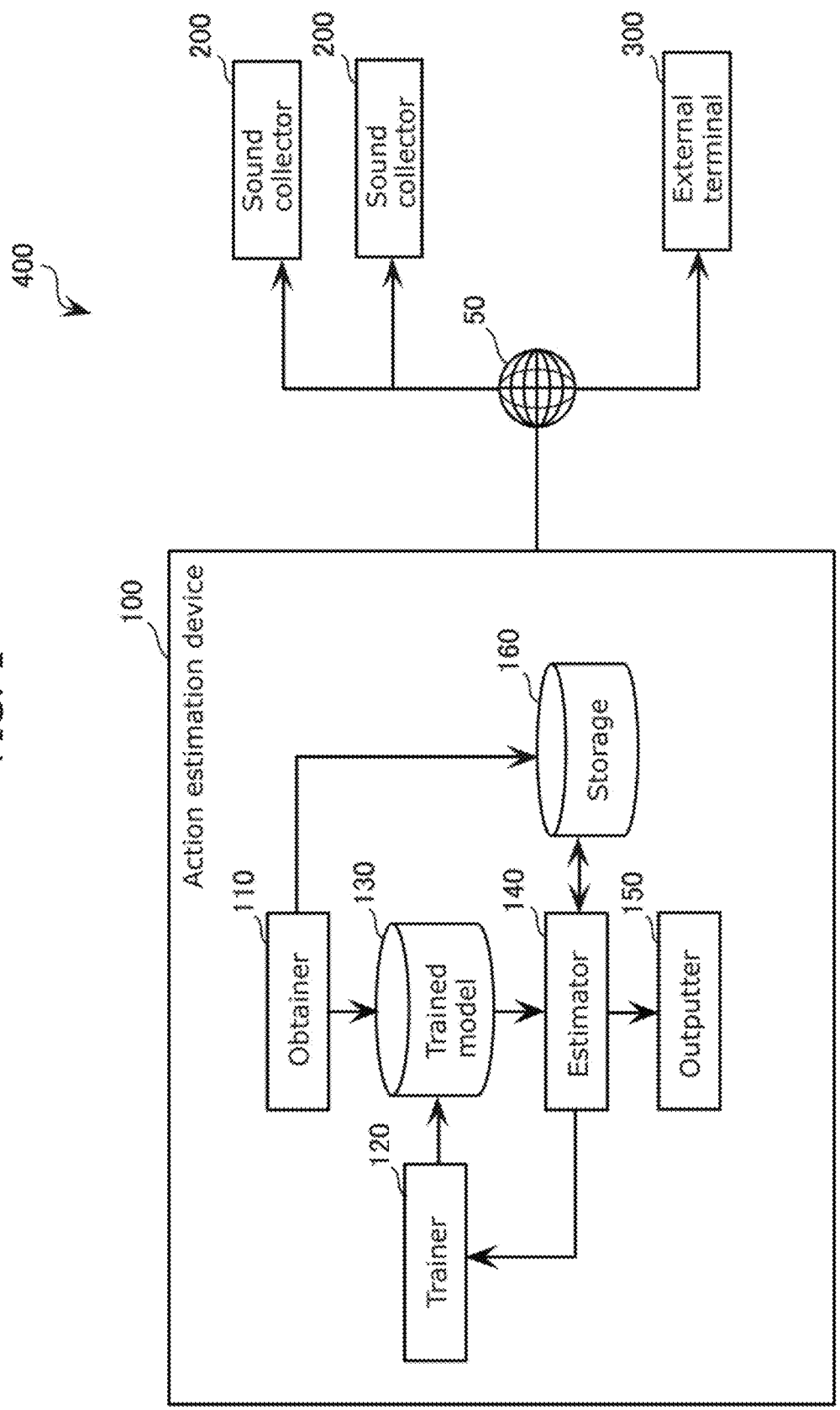
FIG. 1 is a diagram illustrating an example of an action estimation system in which an action estimation device according to Embodiment 1 is applied.

Recent years have seen demand to provide various services to users based on theft daily lives by estimating the users' actions based on audible sounds collected in the users' residences. For example, PTL 1 discloses a technique for distinguishing whether sound collected by a microphone in an environment where television sound is detected is real environment sound produced by a user's actions in the residence or television sounds, and estimating the action of the user in the residence based on learning results pertaining to acoustic features of the real environment sound. However, the technique described in PTL 1 collects audible sounds that can be perceived by human hearing, such as television sound and real environment sound, and estimates the user's actions based on the collected audible sound. This technique is therefore susceptible to the influence of noise from a variety of everyday sounds, making it difficult to say that the technique can accurately estimate the actions of users. In addition, the technique described in PTL 1 collects the voice of users' conversations, for example, as everyday sounds in an audible range, and transmits and receives the collected voice data, which cannot be said to be desirable from the standpoint of protecting the privacy of the users.

Accordingly, the inventors of the present disclosure diligently studied the above-described issues and found that it is possible to accurately estimate a user's actions by using inaudible sounds produced by the user's actions. It was found that this makes it possible to efficiently collect inaudible sounds produced by a user's actions even when collecting audible sounds produced by the user's actions is difficult. The inventors of the present disclosure also found that a user's actions can be estimated based on the collected inaudible sounds.

Therefore, according to the present disclosure, an action estimation device, an action estimation method, and a recording medium capable of accurately estimating the actions of a user can be provided.

Overview of the Present Disclosure

An overview of one aspect of the present disclosure is as follows.

An action estimation device according to one aspect of the present disclosure includes: an obtainer that obtains sound information pertaining to an inaudible sound, the inaudible sound being a sound in an ultrasonic band collected by a sound collector; and an estimator that estimates an output result, obtained by inputting the sound information obtained by the obtainer into a trained model indicating a relationship between the sound information and action information pertaining to an action of a person, as the action information of the person.

Accordingly, by collecting inaudible sound, the action estimation device is not susceptible to the influence of sounds that act as noise, which increases the sound collection accuracy, even when it is difficult to collect audible sounds produced by a person's actions and estimate action information based on the audible sound due to various audible sounds produced around the person, i.e., the influence of sounds that act as noise. Additionally, according to the action estimation device, a person's action information can be estimated even for actions that only produce inaudible sounds, which makes it possible to estimate a greater variety of actions. As such, according to the action estimation device, a person's actions can be estimated accurately.

For example, in the action estimation device according to one aspect of the present disclosure, the sound information input to the trained model may include at least one of a frequency band of the inaudible sound, a duration of the inaudible sound, a sound pressure of the inaudible sound, or a waveform of the inaudible sound. Additionally, a form of the sound information input to the trained model is time-series numerical data of the inaudible sound, an image of a spectrogram, or an image of frequency characteristics.

For example, an action estimation device according to one aspect of the present disclosure may further include: a date and time information recorder that records date and time information pertaining to a date and time at which the inaudible sound is collected by the sound collector; an adjuster that adjusts a sound collection frequency of the sound collector by weighting the sound collection frequency of the sound collector based on a number of times the action information of the person is estimated by the estimator and the date and time information recorded by the date and time information recorder; and an outputter that outputs, to the sound collector, information pertaining to the sound collection frequency adjusted by the adjuster.

Accordingly, the action estimation device adjusts the sound collection frequency based on the date and time information on the inaudible sound collected by the sound collector and the number of times the action information of the person was estimated by the estimator, and can therefore collect sound according to time slots of the person's activities and the person's activity patterns, rather than collecting sound at a constant frequency. This makes it possible to efficiently collect sound and estimate the actions of a person while reducing unnecessary power consumption. Additionally, optimizing the sound collection frequency makes it possible to suppress a rise in temperatures of the sound collector and the action estimation device, which in turn makes it possible to extend the lifespans of the devices. Furthermore, appropriately adjusting the sound collection frequency reduces the load and thus makes it possible to accelerate the processing.

For example, the action estimation device according to one aspect of the present disclosure may further include a location information obtainer that obtains location information pertaining to a location of a sound source of the inaudible sound, and the estimator may estimate the output result, obtained by inputting both the sound information and the location information obtained by the location information obtainer into the trained model, as the action information of the person.

Accordingly, the action estimation device can estimate the actions of a person more accurately because more detailed actions that a person can take depending on the location where a sound is produced can be estimated, even for sound information which has the same characteristics.

For example, in an action estimation device according to one aspect of the present disclosure, the location information obtainer may obtain, as the location information, the location of the sound source derived based on an installation location of the sound collector that collects the inaudible sound.

Accordingly, the action estimation device can derive the installation location of the sound collector that collected the inaudible sound as the location of the sound source, which makes it possible to obtain the location information of the sound source easily.

For example, in an action estimation device according to one aspect of the present disclosure, the location information obtainer may further obtain, as the location information, the location of the sound source derived based on sound information pertaining to an inaudible sound produced by an object having an installation location that does not change, the sound information being obtained by the obtainer.

Accordingly, an inaudible sound produced by an object having an installation location that does not change can be used to derive the location of the sound source, and thus the location information of the sound source can be obtained more accurately.

For example, in an action estimation device according to one aspect of the present disclosure, the location information obtainer may obtain, as the location information, the location of the sound source derived from a direction of the sound source, the direction being identified based on a directivity of the inaudible sound collected by at least two of the sound collectors.

Accordingly, the action estimation device can identify the direction of the sound source based on the directivity of inaudible sounds collected by at least two sound collectors, and thus more detailed location information can be obtained.

For example, an action estimation device according to one aspect of the present disclosure may further include a database that stores the location information of the sound source and the sound information pertaining to the inaudible sound produced by the sound source in association with the action information of the person, and the estimator may further estimate the action information of the person by determining whether the output result of the trained model is probable based on the database.

Accordingly, the action estimation device determines whether the output result of the trained model is probable based on the database, and can therefore estimate the action of a person more accurately.

For example, an action estimation device according to one aspect of the present disclosure may further include a display information generator that generates display information in which at least one of operation information pertaining to an operation of the sound collector or the action information of the person estimated based on the sound information pertaining to the inaudible sound collected by the sound collector is superimposed on layout information indicating a layout of a plurality of rooms in a building in which the sound collector is installed and which room among the plurality of rooms the sound collector is installed in, and the outputter may further output the display information generated by the display information generator to an external terminal.

Accordingly, the action estimation device outputs the display information for display to the external terminal, and thus when action information is estimated, the user can confirm the information through the external terminal.

Additionally, an action estimation method according to one aspect of the present disclosure includes: obtaining sound information pertaining to an inaudible sound, the inaudible sound being a sound in an ultrasonic band collected by a sound collector; and estimating an output result, obtained by inputting the sound information obtained in the obtaining into a trained model indicating a relationship between the sound information and action information pertaining to an action of a person, as the action information of the person.

Accordingly, by collecting inaudible sound, the action estimation method is not susceptible to the influence of sounds that act as noise, which increases the sound collection accuracy, even when it is difficult to collect audible sounds produced by a person's actions and estimate action information based on the audible sound due to various audible sounds produced around the person, i.e., the influence of sounds that act as noise. Additionally, according to the action estimation method, a person's action information can be estimated even for actions that only produce inaudible sounds, which makes it possible to estimate a greater variety of actions. As such, according to the action estimation method, a person's actions can be estimated accurately.

Additionally, a recording medium according to one aspect of the present disclosure is a non-transitory computer-readable recording medium having recorded thereon a program for causing a computer to execute the action estimation method described above.

Accordingly, the same effects as those of the above-described action estimation method can be achieved using a computer.

Note that these comprehensive or specific aspects may be realized by a system, a method, a device, an integrated circuit, a computer program, or a computer-readable recording medium such as a CD-ROM, or may be implemented by any desired combination of systems, methods, devices, integrated circuits, computer programs, and recording media.

Embodiments of the present disclosure will be described in detail hereinafter with reference to the drawings. The numerical values, shapes, materials, constituent elements, arrangements and connection states of constituent elements, steps, orders of steps, and the like in the following embodiments are merely examples, and are not intended to limit the scope of the claims. Additionally, of the constituent elements in the following embodiments, constituent elements not denoted in the independent claims, which express the broadest interpretation, will be described as optional constituent elements. Additionally, the drawings are not necessarily exact illustrations, Configurations that are substantially the same are given the same reference signs in the drawings, and redundant descriptions may be omitted or simplified.

Additionally, in the present disclosure, terms indicating relationships between elements, such as "parallel" and "perpendicular", terms indicating the shapes of elements, such as "rectangular", and numerical values do not express the items in question in the strictest sense, but rather include substantially equivalent ranges, e.g., differences of several percent, as well, Embodiment 1

Embodiment 1 will be described in detail hereinafter with reference to the drawings,
Action Estimation System An action estimation system will be described first with reference to FIG. 1, FIG. 1 is a diagram illustrating an example of action estimation system 400 in which action estimation device 100 according to Embodiment 1 is applied, Action estimation system 400 obtains sound information pertaining to an inaudible sound collected by at least one sound collector 200 installed in a predetermined space, estimates an output result obtained by inputting the obtained sound information into trained model 130 as action information of a person, and outputs display information including the estimated action information to external terminal 300.

As illustrated in FIG. 1, action estimation system 400 includes, for example, action estimation device 100, at least one sound collector 200, and external terminal 300. Action estimation device 100 is connected to sound collector 200 and external terminal 300 over wide-area communication network 50, such as the Internet, for example.

Action estimation device 100 is a device that executes an action estimation method including, for example, obtaining sound information pertaining to an inaudible sound collected by sound collector 200, and estimating action information of a person based on an output result obtained by inputting the sound information obtained in the obtaining into trained model 130, which indicates a relationship between the sound information and the action information of the person. The inaudible sound is a sound at a frequency which cannot be perceived by human hearing, and is a sound in an ultrasonic band, for example. The sound in the ultrasonic band is a sound in a frequency band of, for example, at least 20 kHz. Trained model 130 will be described later.

Sound collector 200 collects the inaudible sound, which is sound in an ultrasonic band. More specifically, sound collector 200 collects inaudible sound produced in a space where sound collector 200 is installed. For example, sound collector 200 collects inaudible sound produced by an action of a person present in the space, and inaudible sound produced by objects present in the space. The objects present in the space are, for example, household equipment such as water faucets, showers, stoves, windows, doors, and the like; household appliances such as washing machines, dishwashers, vacuum cleaners, air conditioners, fans, lighting, televisions, and the like; furniture such as desks, chairs, beds, shelves, and the like; and household items such as trash cans, storage boxes, umbrella stands, pet supplies, and the like.

Sound collector 200 may be any device capable of collecting inaudible sound, and is a microphone, for example. Although not illustrated in the drawings, sound collector 200 includes a communication interface such as an adapter for wired or wireless communication, communication circuitry, or the like, and connects action estimation device 100 and external terminal 300 over wide-area communication network 50, such as the Internet or the like. In this case, sound collector 200 converts the collected inaudible sound into an electrical signal and outputs the electrical signal resulting from the conversion to action estimation device 100. Sound collector 200 may be installed in any space within a building such as a residence where people reside, or may be installed in a predetermined space, for example. "Space" refers to a space separated by walls, windows, doors, stairs, or the like, and is, for example, an entrance, a hallway, a dressing room, a kitchen, a closet, a room, or the like. At least one sound collector 200 may be installed in a single space. Note that a plurality of rooms within a building may be a plurality of spaces within the budding.

External terminal 300 is, for example, a smartphone, a tablet terminal, a personal computer, a home display, or the like, and includes a display for displaying display information output from action estimation device 100. The display information is generated, for example, by superimposing information in which at least one of operation information pertaining to an operation of sound collector 200 or action information of a person estimated based on the sound information pertaining to the inaudible sound collected by sound collector 200 is superimposed on layout information indicating a layout of a plurality of rooms in a building in which sound collector 200 is installed and which room among the plurality of rooms sound collector 200 is installed in. Note that action estimation device 100 may obtain instruction information pertaining to an instruction input to an inputter (not shown) of external terminal 300 by a user, and generate the display information based on the obtained instruction information, The inputter is, for example, a touch panel, a keyboard, a mouse, a microphone, or the like.

Action Estimation Device

1. Configuration

An example of the configuration of action estimation device 100 will be described next with reference to FIG. 1, Here, descriptions of details described with reference to action estimation system 400 will be omitted or simplified.

As illustrated in FIG. 1, action estimation device 100 includes, for example, obtainer 110, trainer 120, trained model 130, estimator 140, outputter 150, and storage 160, Each constituent element will be described hereinafter.

Obtainer

Obtainer 110 obtains sound information pertaining to an inaudible sound collected by sound collector 200. The sound information is, for example, timer-series numerical data of the inaudible sound collected by sound collector 200, and includes a frequency band, a sound pressure, a waveform, a duration, or the like of the inaudible sound, a date and time at which the inaudible sound was collected, or the like. Obtainer 110 is, for example, a communication interface such as an adapter for wired or wireless communication, communication circuitry, or the like.

Trainer

Trainer 120 builds trained model 130 through learning (e.g., machine learning). Trainer 120 executes machine learning using, for example, at least one set of sound information pertaining to inaudible sounds collected in the past and action information pertaining to an action of a person corresponding to that sound information as supervisory data (what is known as "supervised learning"). The sound information may include the frequency band of the inaudible sound and at least one of the duration, frequency, sound pressure, and waveform of the inaudible sound. The sound information may further include a time at which the inaudible sound was collected, The sound information may be, for example, image data in a format such as Joint Photographic Experts Group (JPEG) or Basic Multilingual Plane (BMP), or numerical data in a format such as Waveform Audio File Format (WAV), The learning performed by trainer 120 is not limited to the supervised learning described above, and may instead be unsupervised learning or reinforcement learning, "Reinforcement learning" is learning actions that maximize value through trial and error. For example, with reinforcement learning, trainer 120 performs training for estimating a type of a person's action based on the relationship between before and after feature locations (e.g., frequency distribution and signal strength) in the sound information, the time of occurrence, the duration, and other actions (e.g., turning a light switch on or off). A reward is a proximity to the type of a person's action already estimated. By performing reinforcement learning, trainer 120 can build trained model 130 capable of estimating actions not present in the supervisory data.

Trained Model

Trained model 130 is obtained from the training performed by trainer 120 (e.g., through machine learning). Trained model 130 is built by learning relationships between the sound information pertaining to inaudible sounds and action information pertaining to a person's actions. As described above, the learning method is not particularly limited, and may be supervised learning, unsupervised learning, or reinforcement learning. Trained model 130 is, for example, a neural network, and more specifically, is a convolutional neural network model (CNN) or a recurrent neural network (RNN). If trained model 130 is a CNN, for example, the estimated action information of the person is output using a spectrogram image as the input. If trained model 130 is an RNN, for example, the user's action is estimating using time-series numerical data of frequency characteristics or a spectrogram as the input.

The sound information input to trained model 130 includes the frequency band of the inaudible sound and at least one of the duration, sound pressure, and waveform of the inaudible sound. The form of the sound information input to trained model 130 is time-series numerical data of the inaudible sound, an image of a spectrogram, or an image of frequency characteristics. These data formats have already been described above, and will therefore not be mentioned here.

Estimator

Estimator 140 estimates an output result, obtained by inputting the sound information obtained by obtainer 110 into trained model 130 indicating a relationship between the sound information and the action information pertaining to an action of a person, as the action information of the person. In the example in FIG. 1, estimator 140 does not include trained model 130, but estimator 140 may include trained model 130. Estimator 140 may store the estimated action information of the person in storage 160, or may output the action information to outputter 150. Note that when estimator 140 has successfully estimated the action of the person, estimator 140 may store the output result and the input at that time (the sound information) as supervisory data in storage 160. In this case, when a predetermined amount of supervisory data is stored, estimator 140 may read out the supervisory data from storage 160 and output the supervisory data to trainer 120. Trainer 120 may then retrain trained model 130 using that supervisory data.

Estimator 140 is implemented by a microcomputer or a processor, for example.

Outputter

Outputter 150 outputs the action information estimated by estimator 140 to external terminal 300, for example. Outputter 150 may, for example, output the action information of the person to external terminal 300 based on an instruction from the user input to external terminal 300. Outputter 150 is connected to sound collector 200 and external terminal 300 by communication with action estimation device 100, for example. Outputter 150 is, for example, a communication module, and may be communication circuitry for communicating wirelessly, or wired communication circuitry for communicating over wires. The communication standard of the communication by outputter 150 is not particularly limited.

Storage

Storage 160 is a storage device that stores computer programs and the like executed by estimator 140. Storage 160 is implemented by semiconductor memory, a Hard Disk Drive (HDD), or the like.

2. Operations

Figure 2:
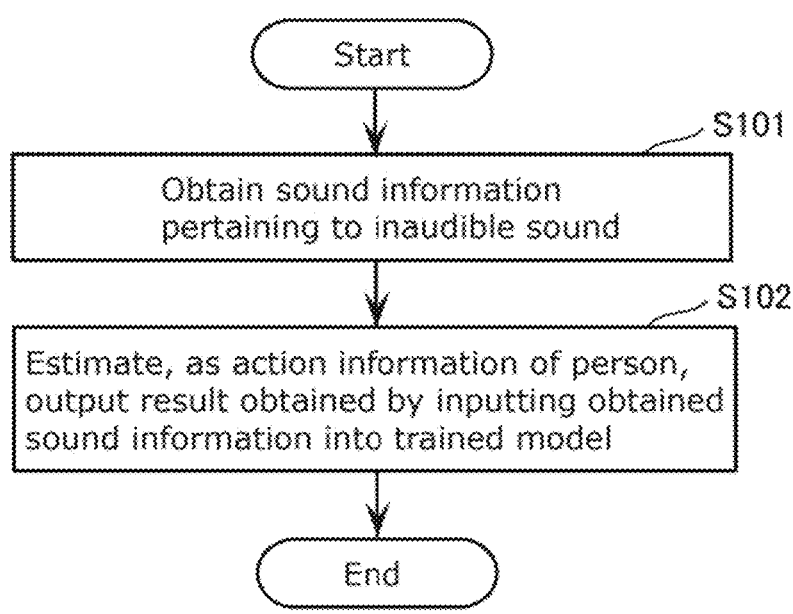
FIG. 2 is a flowchart illustrating an example of operations performed by the action estimation device according to Embodiment 1.

Operations of action estimation device 100 according to Embodiment 1 will be described next with reference to FIGS. 1 and 2. FIG. 2 is a flowchart illustrating an example of operations performed by action estimation device 100 according to Embodiment 1.

Obtainer 110 obtains sound information pertaining to an inaudible sound collected by sound collector 200 (S101), Sound collector 200 is, for example, a microphone, and converts the collected inaudible sound into an electrical signal and outputs the electrical signal resulting from the conversion to action estimation device 100. Obtainer 110 obtains an electrical signal of the inaudible sound collected by sound collector 200, and converts the electrical signal into a digital signal through Pulse Code Modulation (PCM) or the like. Such a digital signal of the inaudible sound will simply be called "sound information". The digital signal of the inaudible sound is, for example, time-series numerical data of the inaudible sound. Note that obtainer 110 is not limited to the above-described method as long as a digital signal of the inaudible sound can be obtained, and for example, an electrical signal of a sound collected by sound collector 200 (e.g., a sound including audible sound and inaudible sound) may be obtained, the electrical signal may be converted into a digital signal, and a digital signal of the inaudible sound may be obtained.

Next, estimator 140 estimates an output result, obtained by inputting the sound information obtained in step S101 into trained model 130 indicating a relationship between the sound information and the action information pertaining to an action of a person, as the action information of the person (S102). For example, when the sound information is obtained by obtainer 110, action estimation device 100 inputs the obtained sound information into trained model 130. The sound information input to trained model 130 includes, for example, the frequency band of the collected inaudible sound and at least one of the duration, sound pressure, and waveform of the inaudible sound. The form of the sound information input to trained model 130, i.e., the data format of the sound information, may be time-series numerical data of the collected inaudible sound, an image of a spectrogram, or an image of frequency characteristics.

Although not illustrated, estimator 140 may output the estimated action information of the person to outputter 150. At this time, estimator 140 may store the estimated action information of the person in storage 160. For example, estimator 140 may store the sound information obtained by obtainer 110 in association with the estimated action information in storage 160.

Action estimation device 100 repeats the above-described processing flow each time obtainer 110 collects sound information.

3. Specific Examples of Action Estimation

The action information of a person estimated by action estimation device 100 according to Embodiment 1 will be described with reference to FIGS. 3 to 9. Each of FIGS. 3 to 9 illustrates an example of the sound information input to trained model 130. In each drawing, (a) indicates an image of a spectrogram, and (b) indicates an image of frequency characteristics.

The spectrogram indicated in (a) is a grayscale image of the time variation of the signal strength of frequency characteristics, with the horizontal axis representing time (seconds) and the vertical axis representing frequency (Hz). In (a), whiter parts indicate a stronger signal strength in the frequency characteristics.

The frequency characteristics indicated in (b) is obtained by performing a Fourier transform on the time-series numerical data of the inaudible sound.

In FIGS. 3 to 9, audible sound collected by sound collector 200 is also included, but as mentioned above, audible sound is difficult to collect and is easily affected by noise, and thus action estimation device 100 estimates the actions of a person on sound information pertaining to inaudible sound of at least 20 kHz, even if the collected sound includes audible sound.

First Example

Figure 3:
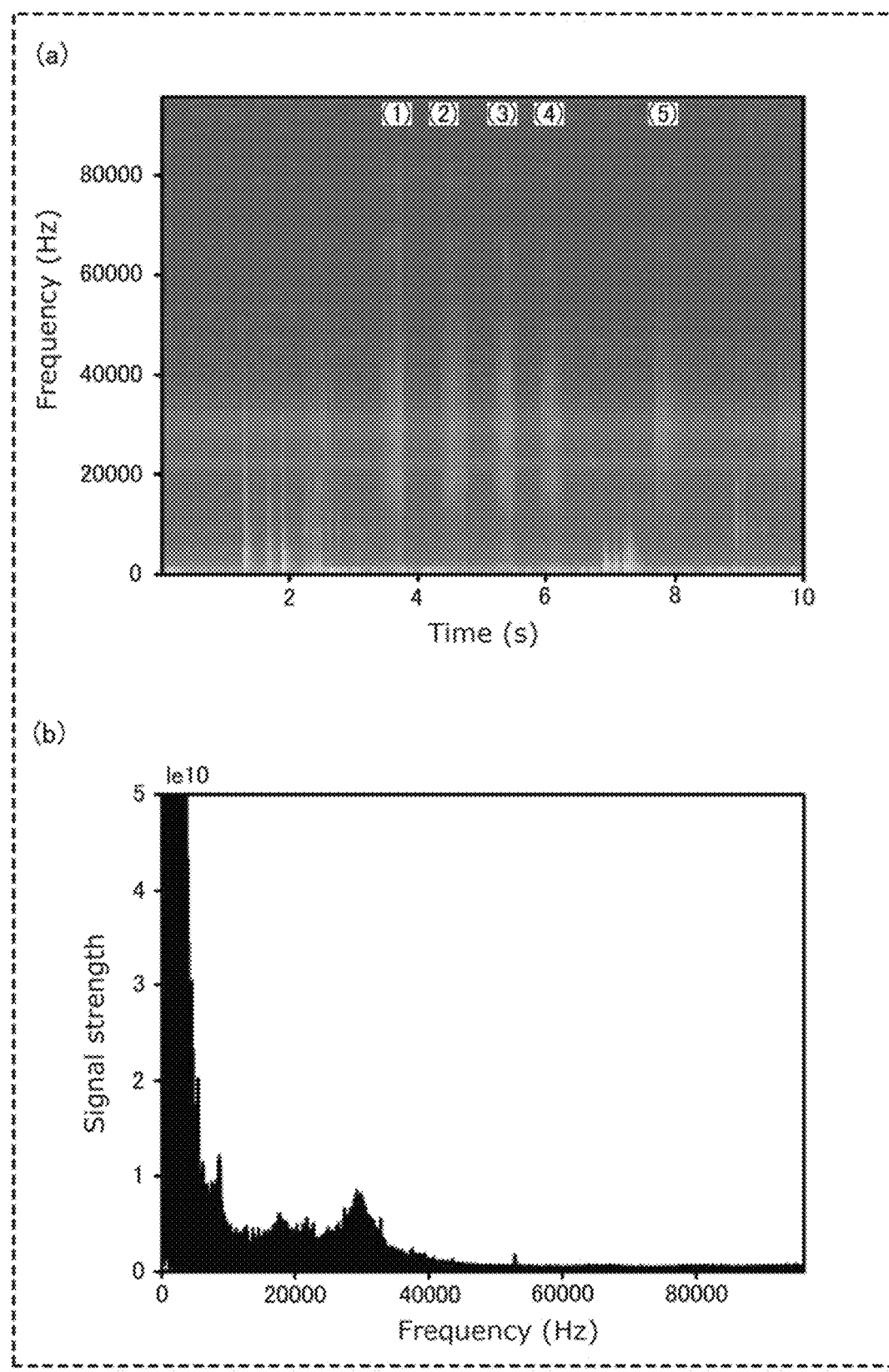
FIG. 3 is a diagram illustrating an example of sound information pertaining to inaudible sound produced when a person removes and puts on clothes.

FIG. 3 is a diagram illustrating an example of sound information pertaining to inaudible sound produced when a person removes and puts on clothes. Here, the material of the clothes is cotton.

In the spectrogram image in (a) in FIG. 3, five characteristic signals (1) to (5) are detected in the frequency band of 20 kHz and above. Signals (1) and (2) are above 80 kHz, signals (3) and (4) are just under 80 kHz, and signal (5) is just under 70 kHz. The signal strength is particularly high at 50 kHz and below. These signals correspond to the sound of clothes rustling when the person removes or puts on the clothes.

Additionally, in the frequency characteristics image in (b) in FIG. 3, the signal strength of frequency components in a frequency band of between 20 kHz and 50 kHz is higher than in the frequency components of 20 kHz and above.

When (a) or (b) in FIG. 3 is input to trained model 130, the output action information of the person is, for example, "removing clothes" or "changing clothes".

Second Example

Figure 4:
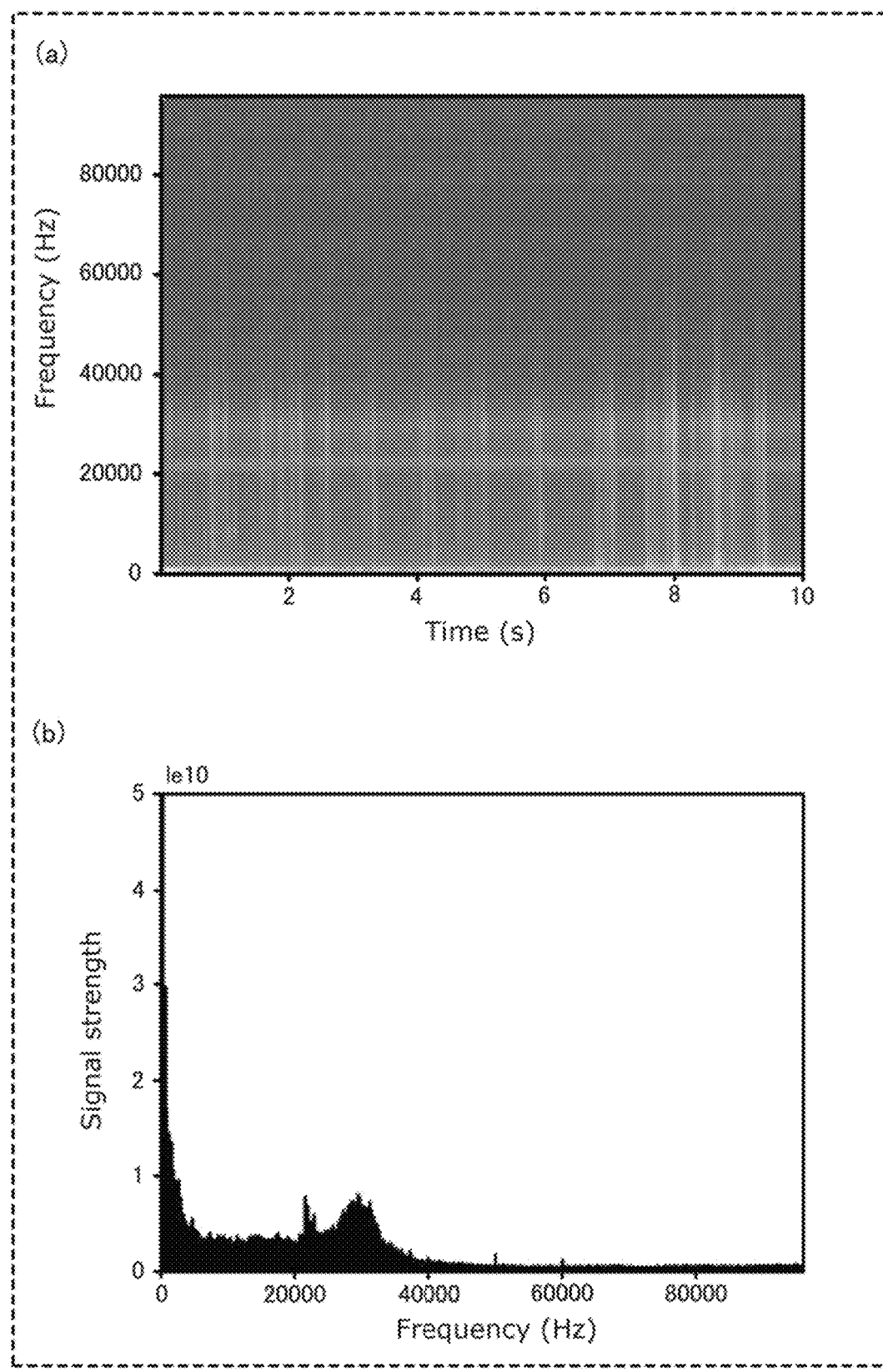
FIG. 4 is a diagram illustrating an example of sound information pertaining to inaudible sound produced when a person walks in a hallway.

FIG. 4 is a diagram illustrating an example of sound information pertaining to inaudible sound produced when a person walks in a hallway. Specifically, this is an inaudible sound produced when a person walks in the hallway barefoot, and then puts on slippers and walks in the hallway.

In the spectrogram image in (a) in FIG. 4, signals corresponding to the rubbing sound between the hallway and the feet when the person walks in the hallway barefoot are detected between 0 and 8 seconds, and signals corresponding to the rubbing sound between the hallway and the slippers when the person walks in the hallway wearing slippers are detected between 8 and 10 seconds. For example, when the person walks in the hallway barefoot, a plurality of characteristic signals are detected in a frequency band between 20 kHz and 50 kHz, and particularly between 20 kHz and 35 kHz. Additionally, when the person walks in the hallway while wearing slippers, a plurality of characteristic signals are detected in a frequency band between 20 kHz and 70 kHz, and particularly between 20 kHz and 40 kHz.

Additionally, in the frequency characteristics image in (b) in FIG. 4, the signal strength of frequency components in a frequency band of between 20 kHz and 40 kHz is higher than in the frequency components of 20 kHz and above.

When (a) or (b) in FIG. 4 is input to trained model 130, the output action information of the person is, for example, "walking".

Third Example

Figure 5:
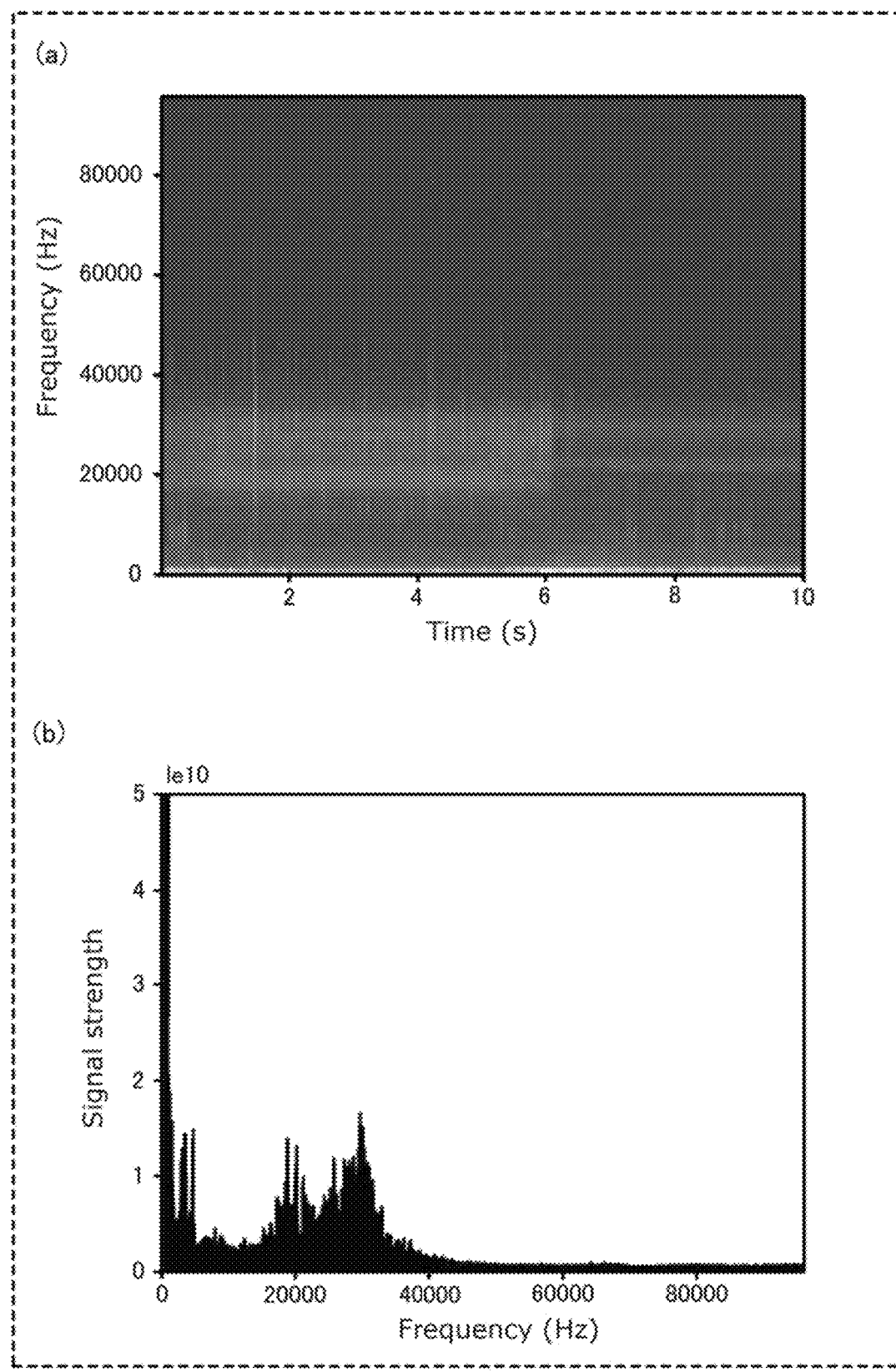
FIG. 5 is a diagram illustrating an example of sound information pertaining to inaudible sound produced when water dribbles from a water faucet.

FIG. 5 is a diagram illustrating an example of sound information pertaining to inaudible sound produced when water dribbles from a water faucet.

In the spectrogram image in (a) in FIG. 5, signals corresponding to the sound of running water are detected between 0 and 6 seconds. A continuous signal is detected from around 20 kHz to around 35 kHz, with a plurality of signals above 40 kHz detected during the continuous signal.

In the frequency characteristics image in (b) in FIG. 5 as well, the signal strength of frequency components in a frequency band of around 20 kHz to 35 kHz is higher than in the frequency components of 20 kHz and above.

When (a) or (b) in FIG. 5 is input to trained model 130, the output action information of the person is, for example, "washing the hands".

Fourth Example

Figure 6:
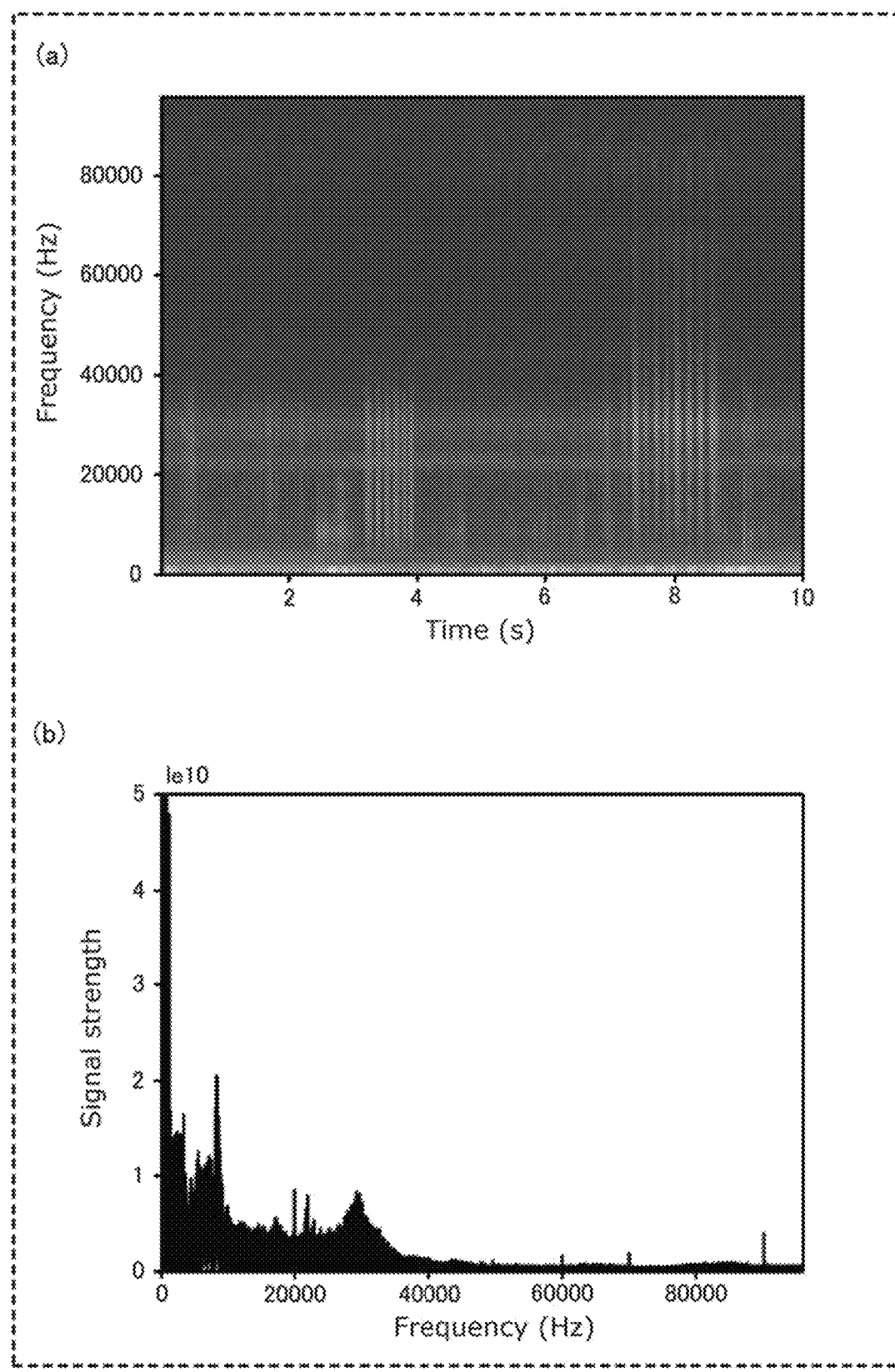
FIG. 6 is a diagram illustrating an example of sound information pertaining to inaudible sound produced when a person lightly scratches their skin.

FIG. 6 is a diagram illustrating an example of sound information pertaining to inaudible sound produced when a person lightly scratches their skin.

In the spectrogram image in (a) in FIG. 6, characteristic signals are detected in a broad frequency band of between 20 kHz and 90 kHz. The detected signals correspond to the sound of skin rubbing against skin when a person lightly scratches their skin, with characteristic signals detected between 3 and 4 seconds and around 8 seconds in particular. The plurality of signals detected between 3 and 4 seconds are signals in a frequency band of between 20 kHz and 40 kHz, and the plurality of signals detected around 8 seconds are in a frequency band of between 20 kHz and 90 kHz.

Additionally, in the frequency characteristics image in (b) in FIG. 6, the signal strength of frequency components in a frequency band of between 20 kHz and 40 kHz and in a frequency band of between 40 kHz and 90 kHz are higher than in the frequency components of 20 kHz and above.

When (a) or (b) in FIG. 6 is input to trained model 130, the output action information of the person is, for example, "scratching an itch".

Fifth Example

Figure 7:
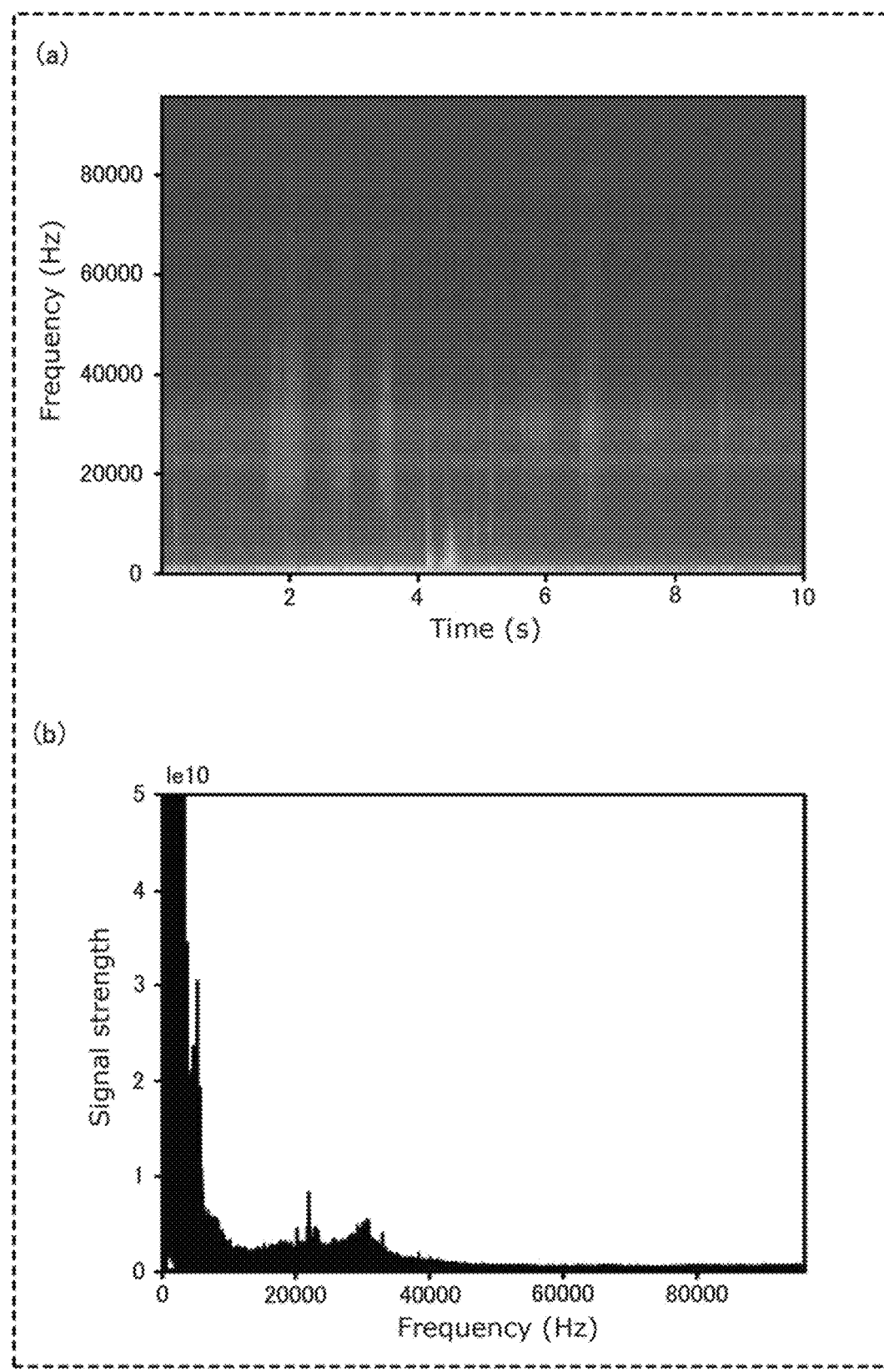
FIG. 7 is a diagram illustrating an example of sound information pertaining to inaudible sound produced when a person brushes their hair.

FIG. 7 is a diagram illustrating an example of sound information pertaining to inaudible sound produced when a person brushes their hair.

In the spectrogram image in (a) in FIG. 7, characteristic signals are detected in a frequency band of between 20 kHz and 60 kHz.

Additionally, in the frequency characteristics image in (b) in FIG. 7, the signal strength of frequency components in a frequency band of between 20 kHz and 50 kHz is higher than in the frequency components of 20 kHz and above.

When (a) or (b) in FIG. 7 is input to trained model 130, the output action information of the person is, for example, "brushing hair".

Sixth and seventh examples will be described next.

Sixth Example

Figure 8:
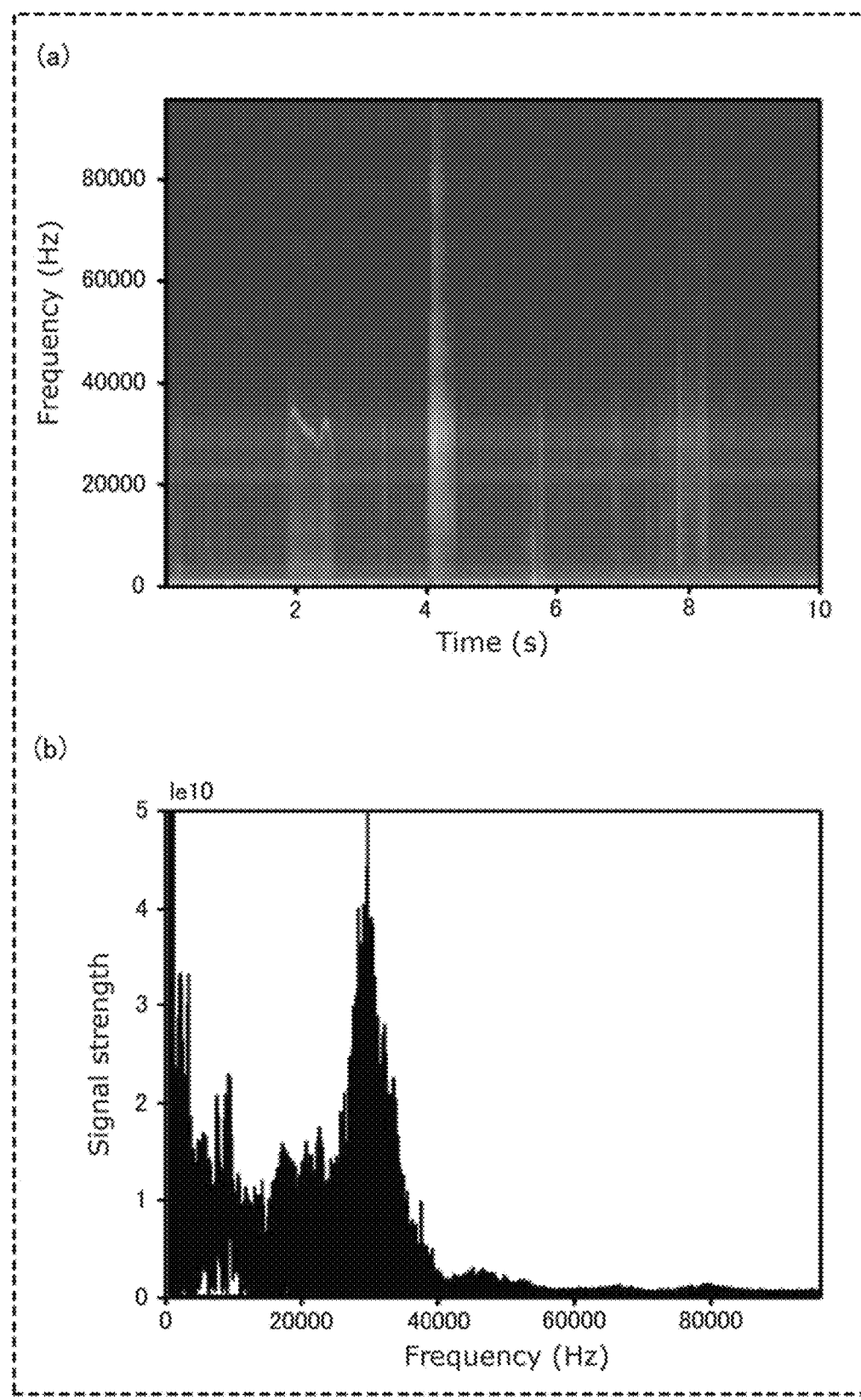
FIG. 8 is a diagram illustrating an example of sound information pertaining to inaudible sound produced when a person sniffles.

FIG. 8 is a diagram illustrating an example of sound information pertaining to inaudible sound produced when a person sniffles. In the spectrogram image in (a) in FIG. 8, a signal corresponding to the sound of air moving due to a person placing a tissue at their nose and sniffling is detected around 2 seconds, and a signal corresponding to the sound of air moving due to a person sniffling without placing anything at the nose is detected around 4 seconds, When a person places a tissue at their nose and sniffles, a characteristic signal is detected in a frequency band from around 20 kHz to around 35 kHz, especially in a frequency band of between 30 kHz and 35 kHz. Meanwhile, when a person sniffs without placing anything at their nose, a characteristic signal is detected in a broad frequency band of from 20 kHz to over 90 kHz. The signal strength is particularly strong in a frequency band of between 20 kHz and 35 kHz.

In the frequency characteristics image in (b) in FIG. 8 as well, the signal strength of frequency components in a frequency band of around 30 kHz to 35 kHz is higher than in the frequency components of 20 kHz and above.

When (a) or (b) in FIG. 8 is input to trained model 130, the output action information of the person is, for example, "sniffling" or "blowing the nose".

Seventh Example

Figure 9:
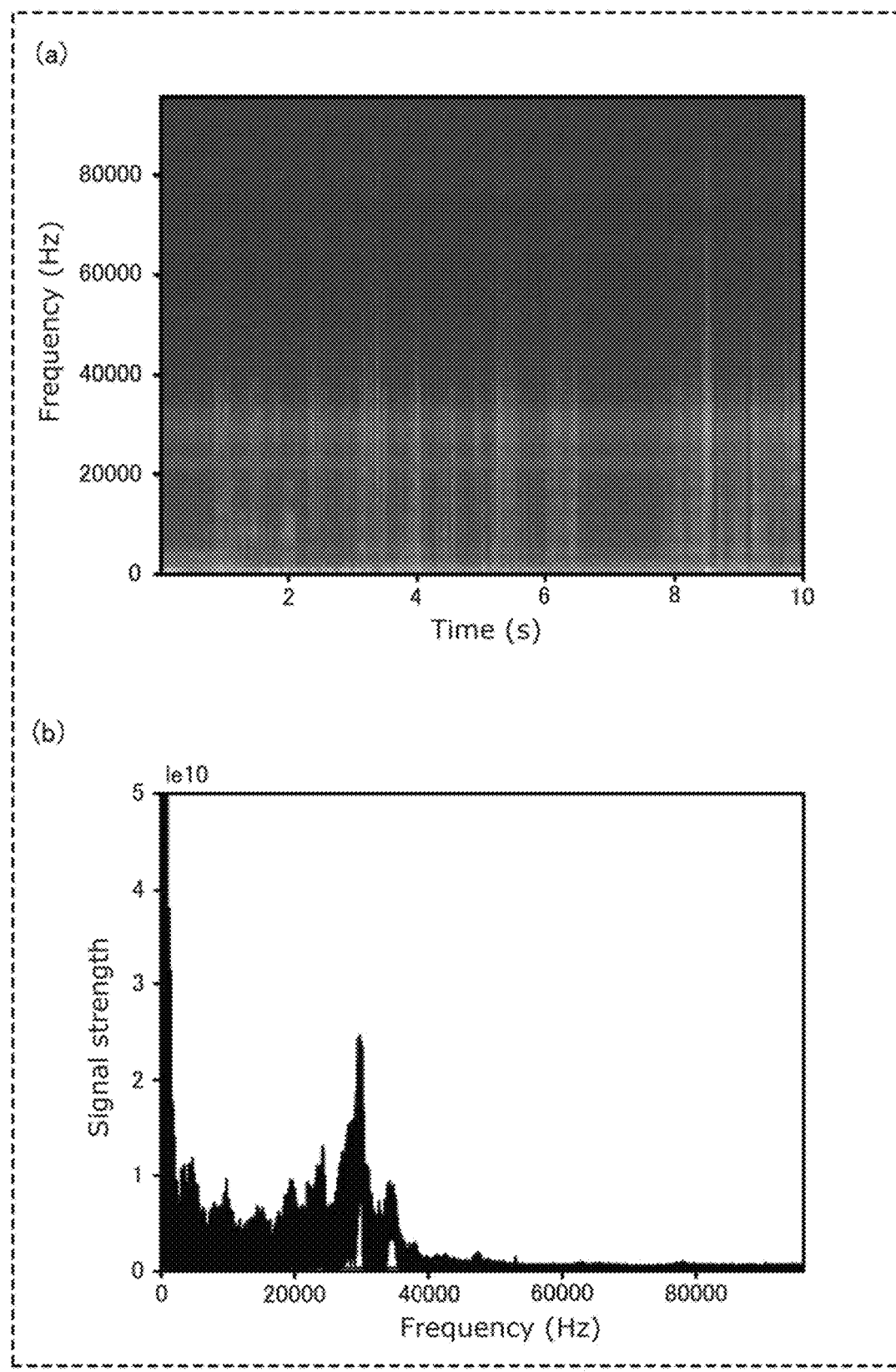
FIG. 9 is a diagram illustrating an example of sound information pertaining to inaudible sound produced when a person passes a belt through theft belt loops.

FIG. 9 is a diagram illustrating an example of sound information pertaining to inaudible sound produced when a person passes a belt through their belt loops.

In the spectrogram image in (a) in FIG. 9, many fine signals are detected in a frequency band of between 20 kHz and 60 kHz, corresponding to the rubbing sound between a belt and cloth when the belt is passed through belt loops, In the frequency characteristics image in (b) in FIG. 9 as well, the signal strength of frequency components in a frequency band from around 20 kHz to 40 kHz and frequency components in a frequency band of between 40 kHz and 60 kHz are higher than in the frequency components of 20 kHz and above.

When (a) or (b) in FIG. 9 is input to trained model 130, the output action information of the person is, for example, "changing clothes".

The first to seventh examples described above are examples where audible sounds are barely or slightly perceived by human hearing and it is difficult to collect the audible sounds and estimate actions based on the audible sounds, but where it is possible to collect inaudible sound and estimate actions based on the inaudible sounds. As described above, according to action estimation device 100, a person's action can be estimated based on inaudible sounds produced by the person's actions even when it is difficult to collect audible sounds produced by the person's actions and estimate the person's actions based on the audible sounds.

Other Examples

The actions of a person that can be estimated based on collected inaudible sounds are not limited to the above-described examples, For example, (1) a person's action information estimated based on the sound of paper rubbing against paper when pulling out toilet paper and the sound of the shaft of toilet paper holder hitting the toilet paper tube is, for example, "using the toilet". In addition, (2) a person's action information estimated based on inaudible sounds produced by opening and closing a window is, for example, "ventilating". In addition, (3) a person's action information estimated based on inaudible sounds produced by opening and closing a sliding door is, for example, "entering or leaving a room". In addition, (4) a person's action information estimated based on inaudible sounds produced when opening or closing a shelf or desk drawer, or when opening or closing a small door provided with a magnet, is, for example, "storing or removing dishes" if the sound comes from a cupboard, and is, for example, "studying" if the sound is emitted from a desk. In addition, (5) a person's action information estimated based on inaudible sounds produced when the dimming of lighting is changed is, for example, "going to sleep", "waking up", or "entering or leaving a room". In addition, (6) a person's action information estimated based on inaudible sounds produced when moving bedding such as a futon, or a rubbing sound between a futon and clothes, is, for example, "going to bed", "sleeping", "waking up", "napping", or "turning over". In addition, (7) a person's action information estimated based on inaudible sounds produced when pouring liquid into a cup is, for example, "drinking a drink".

4. Effects, etc.

As described thus far, action estimation device 100 includes obtainer 110 that obtains sound information pertaining to an inaudible sound, which is a sound in an ultrasonic band, collected by sound collector 200, and estimator 140 that estimates an output result, obtained by inputting the sound information obtained by obtainer 110 into trained model 130 indicating a relationship between the sound information and the action information pertaining to an action of a person, as the action information of the person.

By collecting inaudible sound, action estimation device 100 is not susceptible to the influence of sounds that act as noise, which increases the sound collection accuracy, even when it is difficult to collect audible sounds produced by a person's actions and estimate action information based on the audible sound due to various audible sounds produced around the person, i.e., the influence of sounds that act as noise. Additionally, according to action estimation device 100, a person's action information can be estimated even for actions that only produce inaudible sounds, which makes it possible to estimate a greater variety of actions. As such, according to action estimation device 100, a person's actions can be estimated accurately.

Furthermore, with past techniques, a user's actions are estimated by collecting audible sounds within the user's residence, meaning that data of voice such as conversations and like, for example, is collected as well, which may make it impossible to protect the user's privacy, However, action estimation device 100 estimates a person's actions by collecting inaudible sounds, and can therefore protect the person's privacy.

As such, action estimation device 100 can estimate a person's actions accurately and appropriately.

Action estimation device 100 uses a passive system that estimates actions based on ultrasonic waves produced by a person's actions instead of an active system that emits ultrasonic waves toward the person and estimates the person's actions based on reflected waves, and thus does not need to include an ultrasonic wave emitter. Accordingly, a person's actions can be estimated accurately using a configuration that is simpler than a configuration which includes an ultrasonic wave emitter.

Embodiment 2

An action estimation device according to Embodiment 2 will be described next. In Embodiment 1, an output result obtained by inputting sound information of an inaudible sound collected by sound collector 200 into trained model 130 was estimated as the person's action information. Embodiment 2 differs from Embodiment 1 in that an output result obtained by inputting both the above-described sound information and location information pertaining to the location of a sound source of the inaudible sound into trained model 130 is estimated as the person's action information. The following descriptions will focus upon the differences from Embodiment 1. Note that descriptions of details which are the same as in Embodiment 1 will be omitted or simplified.

1. Configuration

Figure 10:
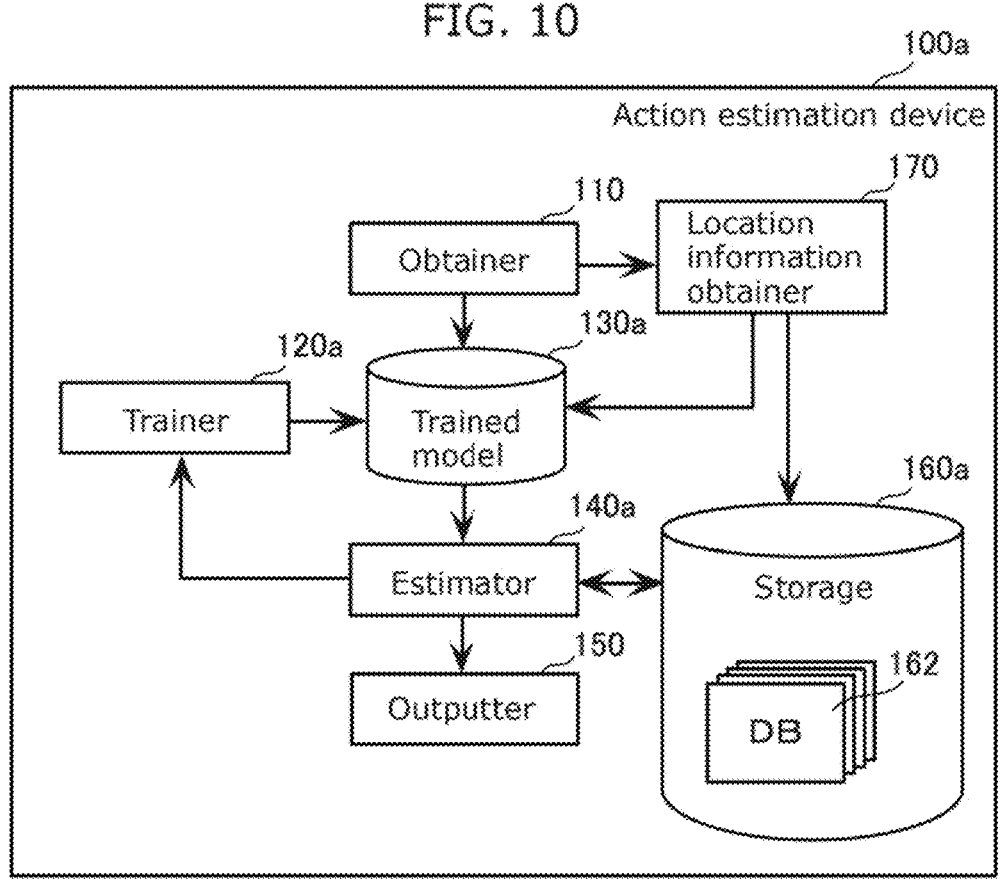
FIG. 10 is a block diagram illustrating an example of the configuration of an action estimation device according to Embodiment 2.

FIG. 10 is a block diagram illustrating an example of the configuration of action estimation device 100a according to Embodiment 2. Action estimation device 100a according to Embodiment 2 includes, for example, obtainer 110, trainer 120a, trained model 130a, estimator 140a, outputter 150, storage 160a, and location information obtainer 170.

Embodiment 2 differs from Embodiment 1 in that trainer 120a, trained model 130a, and estimator 140a use location information in addition to sound information of inaudible sounds, and in that storage 160a stores location information obtained by location information obtainer 170. Embodiment 2 differs from Embodiment 1 particularly in that location information obtainer 170 is included.

Location Information Obtainer

Location information obtainer 170 obtains location information pertaining to the location of a sound source that produced an inaudible sound collected by sound collector 200. "Obtaining location information of a sound source" includes not only simply obtaining transmitted location information, but also deriving (also referred to as "identifying") the location of the sound source. "Sound source" means the source of an inaudible sound produced by a person's action.

For example, location information obtainer 170 obtains, as the location information, the location of the sound source derived based on an installation location of sound collector 200 that collected the inaudible sound. In this case, for example, location information obtainer 170 identifies the space where sound collector 200 that collected the inaudible sound is installed as the location of the sound source, i.e., the place where the sound source is present, and obtains that space as the location information pertaining to the location of the sound source. As described above, "space" refers to a space separated by walls, windows, doors, stairs, or the like, and is, for example, a hallway, an entrance, a dressing room, a kitchen, a room, a closet, or the like. For example, when sound collector 200 that collected an inaudible sound produced by a person's action is in a dressing room, location information obtainer 170 obtains the dressing room as the location information pertaining to the location of the sound source. At this time, for example, if sound collector 200 has collected an inaudible sound produced when a person removes or puts on clothes, the person's action information estimated based on the sound information and the location information is "taking a bath". Additionally, for example, when sound collector 200 that collected an inaudible sound produced by a person's action is in a closet, location information obtainer 170 obtains the closet as the location information pertaining to the location of the sound source. At this time, for example, if sound collector 200 has collected an inaudible sound produced when a person removes or puts on clothes, the person's action information estimated based on the sound information and the location information is "changing clothes".

Additionally, for example, location information obtainer 170 may further obtain, as the location information, the location of the sound source derived based on sound information pertaining to an inaudible sound from an object having an installation location that does not change, the sound information being obtained by obtainer 110. In this case, for example, upon determining that the sound information collected by obtainer 110 includes sound information pertaining to an inaudible sound produced by an object having an installation location that does not change, location information obtainer 170 obtains the space in which that object is installed as the location where the sound source is present, i.e., as the location information indicating the place where the sound source is present. The "installation location of an object not changing" may mean that the installation location of the object in a predetermined space does not change, or that the space in which the object is installed does not change. For example, a dishwasher is installed in the kitchen, and even if the installation location of the dishwasher in the kitchen changes, the installation location of the dishwasher will not change to a space aside from the kitchen. In this manner, the object having an installation location that does not change is not limited to a dishwasher, and may be a washing machine, a shower, a water faucet, a television, or the like. For example, when the object having an installation location that does not change is a washing machine, upon determining that the sound information pertaining to the inaudible sound collected by sound collector 200 includes sound information pertaining to an inaudible sound produced by a washing machine, location information obtainer 170 obtains the space in which the washing machine is installed, i.e., a dressing room, as the location information pertaining to the location of the sound source. At this time, for example, if sound collector 200 has collected an inaudible sound produced when a person removes or puts on clothes, the person's action information estimated based on the sound information and the location information is "taking a bath". Additionally, for example, when the object having an installation location that does not change is a television, upon determining that the sound information pertaining to the inaudible sound collected by sound collector 200 includes sound information pertaining to an inaudible sound produced by a television, location information obtainer 170 obtains the space in which the television is installed, i.e., a living room, as the location information pertaining to the location of the sound source. At this time, for example, if sound collector 200 has collected an inaudible sound produced when a person removes or puts on clothes, the person's action information estimated based on the sound information and the location information is "changing clothes". Note that "changing clothes" includes the action of taking off outerwear such as a coat or putting on outerwear such as a coat.

Additionally, for example, location information obtainer 170 may obtain, as the location information, the location of the sound source derived from a direction of the sound source, the direction being identified based on a directivity of the inaudible sound collected by at least two sound collectors 200. The at least two sound collectors 200 may be installed in a single space, or the at least two sound collectors 200 may be installed separately in different spaces. When, for example, the at least two sound collectors 200 are installed in a single space, the location of the sound source in the space can be identified based on the directivity of inaudible sounds collected by sound collectors 200. For example, if the at least two sound collectors 200 are installed in a room having a closet, when sound collectors 200 collect an inaudible sound corresponding to taking off or putting on clothes, location information obtainer 170 identifies the direction of the sound source as being the location of the closet based on the directivity of the collected inaudible sound. In other words, location information obtainer 170 obtains the closet as the location information of the sound source, based on the directivity of the collected inaudible sound. At this time, the action information of the person, estimated based on the sound information and the location information, is "changing clothes". For example, if two sound collectors 200 are installed separately in a dressing room and a hallway, when these sound collectors 200 collect an inaudible sound corresponding to taking off or putting on clothes, location information obtainer 170 identifies the direction of the sound source as being the location of the dressing room based on the directivity of the collected inaudible sound. In other words, the location information of the sound source obtained by location information obtainer 170 is the dressing room. At this time, the action information of the person, estimated based on the sound information and the location information, is "taking a bath".

As described thus far, action estimation device 100a according to Embodiment 2 can estimate a person's actions based on the sound information of an inaudible sound produced by the person's action and the location information of the sound source of the inaudible sound, and can therefore accurately estimate the person's action.

2. Operations

Figure 11:
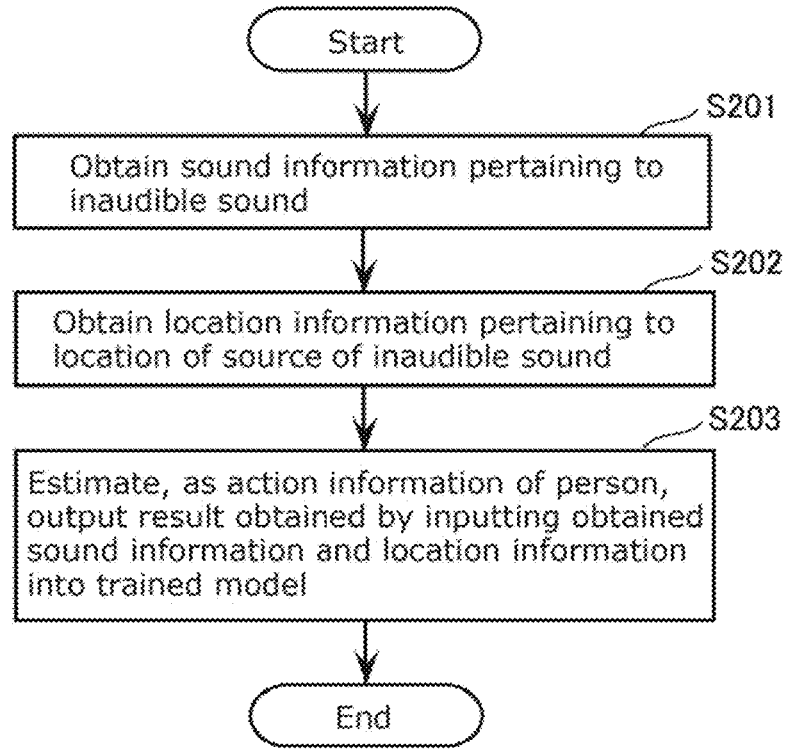
FIG. 11 is a flowchart illustrating an example of operations performed by the action estimation device according to Embodiment 2.

Operations performed by action estimation device 100a will be described next with reference to FIGS. 10 and 11. FIG. 11 is a flowchart illustrating an example of operations performed by action estimation device 100a according to Embodiment 2.

Obtainer 110 obtains sound information pertaining to an inaudible sound collected by sound collector 200 (see FIG. 1) (S201). Step S201 is the same as step S101 in FIG. 2.

Next, location information obtainer 170 obtains location information pertaining to the location of the sound source that produced the inaudible sound collected by sound collector 200 (S202). As described above, location information obtainer 170 obtains, as the location information, the location of the sound source derived based on the installation location of sound collector 200. Additionally, location information obtainer 170 may obtain, as the location information, the location of the sound source derived based on sound information pertaining to an inaudible sound from an object having an installation location that does not change. Additionally, location information obtainer 170 may obtain, as the location information, the location of the sound source derived from a direction of the sound source, the direction being identified based on a directivity of the inaudible sound collected by at least two sound collectors 200.

Next, estimator 140a estimates an output result, obtained by inputting the sound information obtained in step S201 and the location information of the sound source obtained in step S202 into trained model 130a indicating a relationship between (i) the sound information and the location information of the sound source and (ii) the action information pertaining to an action of a person, as the action information of the person (S203). For example, when the sound information is obtained by obtainer 110 and the location information of the sound source is obtained by location information obtainer 170, action estimation device 100a inputs the obtained sound information and location information of the sound source into trained model 130a. The sound information input to trained model 130a and the form of the sound information, i.e., the data format of the sound information, are the same as those described in Embodiment 1, and will therefore not be described here. Trained model 130a is built by trainer 120a through machine learning, in which at least one set of (i) sound information and location information of a sound source and (ii) action information pertaining to an action of a person corresponding to the sound information and the location information of the sound source is used as supervisory data.

Although not illustrated, estimator 140a may output the estimated action information of the person to outputter 150. At this time, estimator 140a may store the estimated action information of the person in storage 160a. For example, estimator 140a may store the sound information obtained by obtainer 110 and the location information of the sound source obtained by location information obtainer 170 in association with the estimated action information in storage 160a.

Action estimation device 100a repeats the above-described processing flow each time obtainer 110 collects sound information.

3. Specific Examples of Action Estimation

The action information of a person estimated by action estimation device 100a according to Embodiment 2 will be described with reference again to FIGS. 3 and 5.

First Example

FIG. 3 illustrates an example of sound information pertaining to inaudible sound produced when a person removes and puts on clothes. In Embodiment 1, the output result obtained by inputting the sound information illustrated in FIG. 3 into trained model 130 was, for example, "removing clothes" or "changing clothes".

In Embodiment 2, the location information of the sound source is input into trained model 130a along with the sound information illustrated in FIG. 3. For example, when the location information of the sound source is the dressing room, the action information of the person output from trained model 130a is, for example, "taking a bath" or "removing clothes". Additionally, for example, when the location information of the sound source is the living room or the closet, the action information of the person output from trained model 130a is, for example, "changing clothes". Additionally, for example, if the location information of the sound source is a bedroom or a bed, the action information of the person output from trained model 130a is an action related to sleep, such as "going to sleep", "waking up", "sleeping", "napping", or the like.

Second Example

FIG. 5 illustrates an example of sound information pertaining to inaudible sound produced when water dribbles from a water faucet. In Embodiment 1, the output result obtained by inputting the sound information illustrated in FIG. 5 into trained model 130 was, for example, "washing the hands".

In Embodiment 2, the location information of the sound source is input into trained model 130a along with the sound information illustrated in FIG. 5. For example, when the location information of the sound source is the washroom, the action information of the person output from trained model 130a is, for example, "washing the hands", "brushing teeth", or "washing the face".

Third Example

For example, if obtainer 110 has obtained the sound information illustrated in FIG. 3 and the sound information illustrated in FIG. 5, and when, based on sound information pertaining to an inaudible sound produced by an object having an installation location that does not change (here, the water faucet, indicated in FIG. 5), location information obtainer 170 obtains a bathroom (the sound of running water) and a dressing room (removing or putting on clothes) as the location of the sound source, the action information of the person output from trained model 130a is, for example, "taking a bath".

4. Effects, etc.

As described thus far, action estimation device 100a further includes location information obtainer 170 that obtains location information pertaining to a location of a sound source that produces an inaudible sound, and estimator 140a estimates, as action information of a person, an output result obtained by inputting both the sound information obtained by obtainer 110 and the location information obtained by location information obtainer 170 into trained model 130a.

This action estimation device 100a can estimate the actions of a person more accurately because more detailed actions that a person can take depending on the location where a sound is produced can be estimated, even for sound information which has the same characteristics.

Variation 1 on Embodiment 2

Variation 1 on Embodiment 2 will be described next. In Embodiment 2, an output result obtained by inputting sound information and location information of the sound source into trained model 130a was estimated as the action information of a person, but Variation 1 on Embodiment 2 differs from Embodiment 2 in that the action information of the person is estimated by determining whether the output result of trained model 130a is probable based on a database. The following descriptions will focus upon the differences from Embodiment 2. Note that descriptions of details which are the same as in Embodiments 1 and 2 will be omitted or simplified.

1. Configuration

Here, only the configurations different from Embodiment 2 will be described. Referring again to FIG. 10, Variation 1 on Embodiment 2 differs from Embodiment 2 in that action estimation device 100a further includes database 162 that stores location information of a sound source and sound information pertaining to an inaudible sound produced by the sound source in association with action information of a person.

Figures 12, 13:
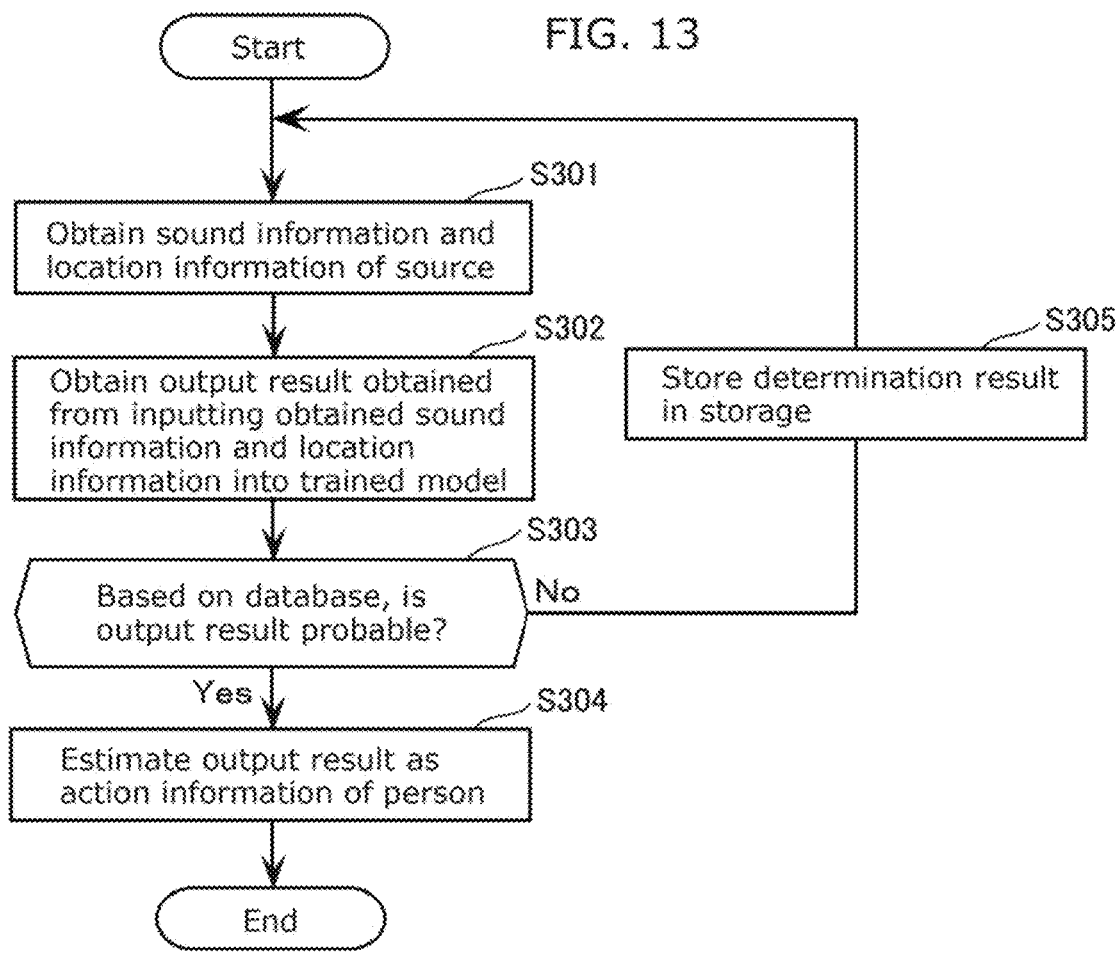
FIG. 12 is a diagram illustrating an example of a database.
FIG. 13 is a flowchart illustrating an example of operations performed by the action estimation device according to Variation 1 on Embodiment 2.

FIG. 12 is a diagram illustrating an example of database 162. As illustrated in FIG. 12, database 162 stores sound information having the same characteristics but with different action information associated depending on the location information of sound source. Database 162 is used when estimator 140a determines whether the output result from trained model 130a is probable.

2. Operations

Operations of action estimation device 100a according to Variation 1 on Embodiment 2 will be described next with reference to FIGS. 10 and 13. FIG. 13 is a flowchart illustrating an example of operations performed by action estimation device 100a according to Variation 1 on Embodiment 2. In FIG. 13, steps S201 and S202 in FIG. 11 are illustrated as a single step S301.

First, obtainer 110 obtains sound information pertaining to an inaudible sound collected by sound collector 200. Then, location information obtainer 170 obtains location information pertaining to the location of the sound source of the inaudible sound (S301).

Next, estimator 140a obtains an output result obtained by inputting the sound information and the location information obtained in step S301 into trained model 130a (S302).

Next, based on database 162, estimator 140a determines whether the output result from trained model 130a is probable (S303). In step S303, whether the output result is probable is determined according to whether a set of (i) the sound information and the location information input to trained model 130a and (ii) the action information that is the output result is in database 162. If the output result from trained model 130a is determined to be probable (Yes in S303), estimator 140a estimates the output result as the action information of the person (S304). On the other hand, if the output result from trained model 130a is determined not to be probable (No in S303), estimator 140a stores the result of that determination in storage 160a (S305). At this time, estimator 140a may store the sound information and location information input to trained model 130a, the output result, and the determination result in association with each other in storage 160a. Trainer 120a may retrain trained model 130a using the stored information, for example.

3. Specific Examples of Action Estimation

The action information of a person estimated by action estimation device 100a according to Variation 1 on Embodiment 2 will be described with reference again to FIGS. 3, 5, and 12.

First Example

FIG. 3 illustrates an example of sound information pertaining to inaudible sound produced when a person removes and puts on clothes, i.e., sound information of the sound of cloth rustling indicated in FIG. 12.

In Embodiment 2, the output result obtained by inputting both the sound information illustrated in FIG. 3 and the location information of the sound source (e.g., dressing room) into trained model 130a was, for example, "taking a bath" or "removing clothes". In Variation 1 on Embodiment 2, by using database 162 to determine whether the output result is probable, the output result of "removing clothes" is determined to be probable, and "removing clothes" is estimated as the action information.

Second Example

FIG. 5 illustrates an example of sound information pertaining to inaudible sound produced when water dribbles from a water faucet, i.e., sound information of the sound of running water indicated in FIG. 12.

In Embodiment 2, the output result obtained by inputting both the sound information illustrated in FIG. 5 and the location information of the sound source (e.g., washroom) into trained model 130a was, for example, "washing the hands", "brushing teeth", or "washing the face". In Variation 1 on Embodiment 2, by using database 162 to determine whether the output result is probable, the output result of "washing the hands" is determined to be probable, and "washing the hands" is estimated as the action information.

4. Effects, etc.

As described thus far, action estimation device 100a further includes database 162 that stores the location information of the sound source and the sound information pertaining to an inaudible sound produced by the sound source in association with the action information of a person, and estimator 140a further estimates the action information of a person by determining whether the output result of trained model 130a is probable based on database 162.

This action estimation device 100a determines whether the output result of trained model 130a is probable based on database 162, and can therefore estimate the action of a person more accurately.

Embodiment 3

Action estimation device 100b according to Embodiment 3 will be described next. Embodiment 3 differs from Embodiment 1, Embodiment 2, and Variation 1 on Embodiment 2 in that action estimation device 100b adjusts a sound collection frequency by sound collector 200 between time slots in which a person is and is not active. The following descriptions will focus upon the differences from the above-described embodiments. Note that descriptions of details which are the same as in the above-described embodiments will be omitted or simplified.

1. Configuration

Figure 14:
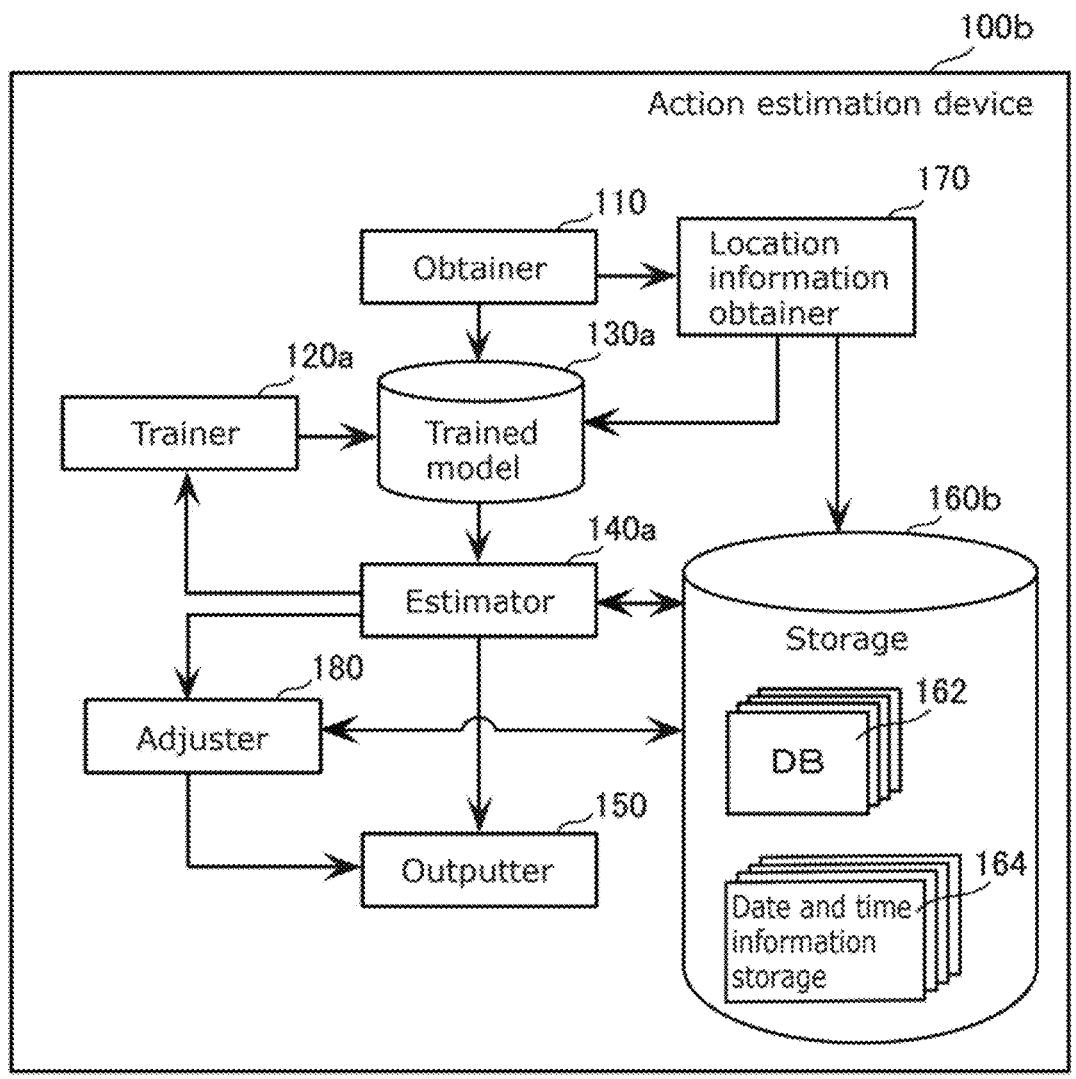
FIG. 14 is a block diagram illustrating an example of the configuration of an action estimation device according to Embodiment 3.

FIG. 14 is a block diagram illustrating an example of the configuration of action estimation device 100b according to Embodiment 3. Action estimation device 100b according to Embodiment 3 includes, for example, obtainer 110, trainer 120a, trained model 130a, estimator 140a, outputter 150, storage 160b, location information obtainer 170, and adjuster 180.

Embodiment 3 differs from the above-described embodiments particularly in that date and time information recorder 164 and adjuster 180 are provided.

Date and Time Information Recorder

Date and time information recorder 164 records date and time information pertaining to a date and time at which the inaudible sound is collected by sound collector 200. Date and time information recorder 164 may, for example, record the date and time information in association with the sound information pertaining to the inaudible sound collected by sound collector 200. In the example in FIG. 14, date and time information recorder 164 is stored in storage 160b, but may be a recording device provided separately from storage 160b.

Adjuster

Adjuster 180 adjusts a sound collection frequency of sound collector 200 by weighting the sound collection frequency of sound collector 200 based on a number of times the action information of the person is estimated by estimator 140a and the date and time information recorded by date and time information recorder 164. For example, adjuster 180 may adjust the sound collection frequency using a predetermined arithmetic formula. The sound collection frequency may be adjusted at predetermined intervals, for example, weekly, monthly, every three months, or the like. The adjustment of the sound collection frequency using an arithmetic formula will be described in detail hereinafter with reference to FIG. 15. FIG. 15 is a diagram illustrating an example of adjusting the sound collection frequency by action estimation device 100b according to Embodiment 3. This adjustment will also be called "optimization" hereinafter.

As illustrated in FIG. 15, sound collectors 200 are installed in, for example, the living room, the kitchen, and the washroom of a residence. The number of action estimations is, for example, an average value of the number of action estimations for each of time slots from 0:00 to 23:00 over a set period of time in the past (e.g., one week or the like). In the example in FIG. 15, (A) the number of action estimations is the one-week average value of the number of action estimations executed when a sound pressure of −40 dB or higher is detected when sound collector 200 performs one-minute measurements at six-minute intervals in each time slot ((B) the pre-optimization sound collection frequency in the drawing).

(C1) The post-optimization sound collection frequency in the drawing is derived through the following Formula (1), $$\text{post-optimization sound collection frequency} = \text{number of action estimations}/\text{pre-optimization sound collection frequency} \times 10 + 3 \quad (1)$$

Here, the "sound collection frequency" is the number of times sound is collected per hour.

Upon adjusting the sound collection frequency of each sound collector 200, adjuster 180 outputs the adjusted sound collection frequency, or in other words, information pertaining to the post-optimization sound collection frequency, to outputter 150. The information pertaining to the sound collection frequency may be, for example, information pertaining to the time at which sound collector 200 collected sound.

Additionally, for example, adjuster 180 may adjust the sound collection frequency using a neural network model (not shown) built through machine learning. The neural network model may be, for example, a multilayer neural network model indicating a relationship between the pre-optimization number of action estimations and the post-optimization sound collection frequency in each time slot. The machine learning may be supervised learning, unsupervised learning, or reinforcement learning. For example, when supervised learning is executed, the supervisory data may be created for each space in which sound collector 200 is installed. Additionally, Deep Q Network or the like may be used as the algorithm for reinforcement learning, for example.

The adjustment of the sound collection frequency using a neural network model will be described in detail hereinafter with reference to FIG. 16. FIG. 16 is a diagram illustrating another example of adjusting a sound collection frequency of action estimation device 100b according to Embodiment 3.

The inputs for the neural network model are, for example, the time slots and (A) the number of action estimations in each time slot in FIG. 16. The output of the neural network model is the adjusted sound collection frequency, e.g., (C2) the post-optimization sound collection frequency in FIG. 16.

In the example in FIG. 16, (C2) the post-optimization sound collection frequency is adjusted by inserting a Softmax function into the output only when the total output of the neural network model exceeds 30, so that the total does not exceed 30.

Outputter

In Embodiment 3, outputter 150 outputs information pertaining to the sound collection frequency adjusted by adjuster 180 to sound collector 200. As described in Embodiment 1, outputter 150 is connected to sound collector 200 over wide-area communication network 50. Outputter 150 is a communication module for communication between sound collector 200 and external terminal 300. The communication may be wireless communication or wired communication. The communication standard used in the communication, too, is not particularly limited.

2. Operations

Figure 17:
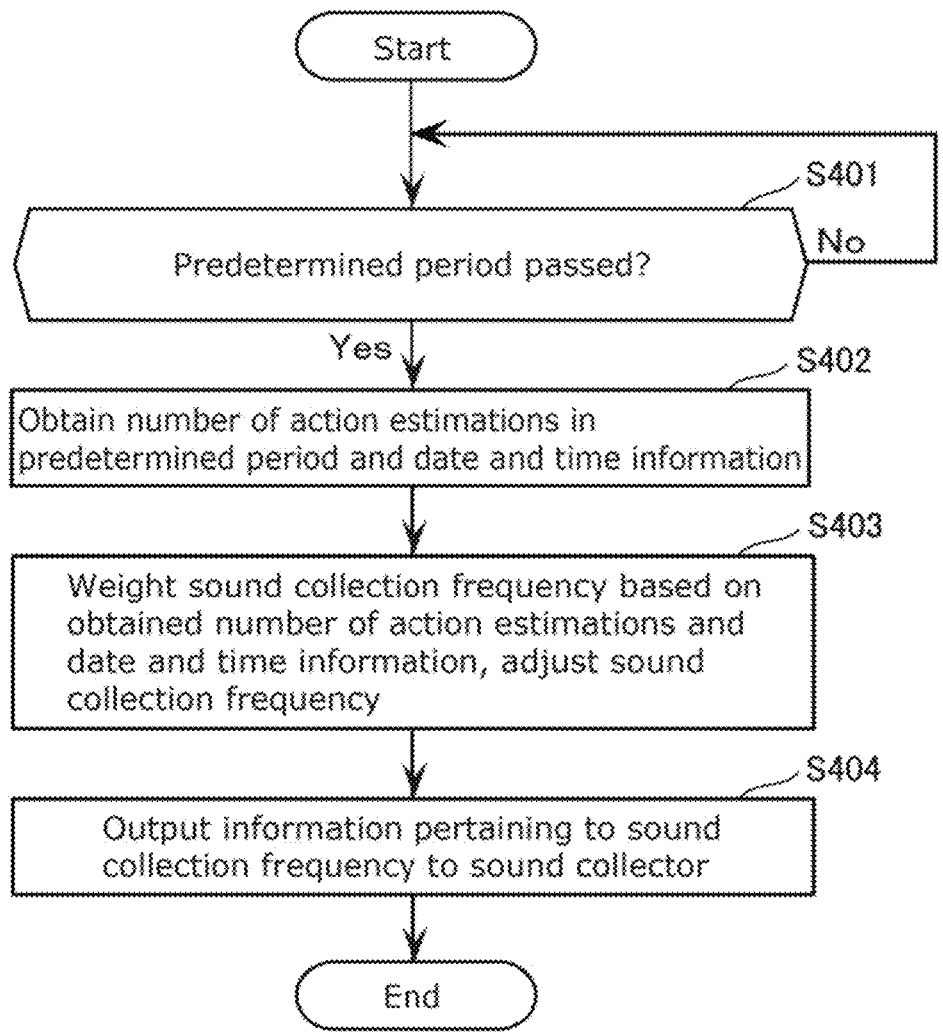
FIG. 17 is a flowchart illustrating an example of operations performed by the action estimation device according to Embodiment 3.

Operations of action estimation device 100b according to Embodiment 3 will be described next with reference to FIGS. 14 and 17. FIG. 17 is a flowchart illustrating an example of operations performed by action estimation device 100b according to Embodiment 3. A flow of adjusting the sound collection frequency will be described here.

First, adjuster 180 determines whether a predetermined period has passed (S401). If adjuster 180 determines that the predetermined period has not passed (No in S401), the processing returns to step S401.

On the other hand, if it is determined that the predetermined period has passed (Yes in S401), adjuster 180 obtains the number of times the action information of a person has been estimated by estimator 140a in the predetermined period (the "number of action estimations") and the date and time information pertaining to the date and time at which the inaudible sound was collected by sound collector 200

(S402). For example, adjuster 180 may read out the number of estimations executed by estimator 140*a* from storage 160*b* and read out the date and time information from date and time information recorder 164, or the date and time information and the number of action estimations in the predetermined period may be recorded in date and time information recorder 164, and that information may be read out from date and time information recorder 164.

Next, based on the obtained number of action estimations and date and time information, adjuster 180 adjusts the sound collection frequency by weighting the sound collection frequency of sound collector 200 (S403). As described above, adjuster 180 may adjust the sound collection frequency using an arithmetic formula or a neural network model.

Next, adjuster 180 outputs the information pertaining to the adjusted sound collection frequency to outputter 150 (not shown). Outputter 150 outputs the obtained information pertaining to the sound collection frequency to sound collector 200 (S404).

3. Effects, etc.

As described thus far, action estimation device 100*b* includes date and time information recorder 164 that records date and time information pertaining to a date and time at which the inaudible sound is collected by sound collector 200, adjuster 180 that adjusts the sound collection frequency of sound collector 200 by weighting the sound collection frequency of sound collector 200 based on a number of times the action information of the person is estimated by estimator 140*a* and the date and time information recorded by date and time information recorder 164; and outputter 150 that outputs, to sound collector 200, information pertaining to the sound collection frequency adjusted by adjuster 180.

This action estimation device 100*b* adjusts the sound collection frequency based on the date and time information on the inaudible sound collected by sound collector 200 and the number of times the action information of the person was estimated by estimator 140*a*, and can therefore collect sound according to time slots of the person's activities and the person's activity patterns, rather than collecting sound at a constant frequency. This makes it possible to efficiently collect sound and estimate the actions of a person while reducing unnecessary power consumption. Additionally, optimizing the sound collection frequency makes it possible to suppress a rise in temperatures of sound collector 200 and action estimation device 100*b*, which in turn makes it possible to extend the lifespans of the devices. Furthermore, appropriately adjusting the sound collection frequency reduces the load and thus makes it possible to accelerate the processing.

Embodiment 4

Action estimation device 100*c* according to Embodiment 4 will be described next. Embodiment 4 differs from the above-described embodiments and variations in that display information including the information obtained and derived by action estimation device 100*c* is created and output to external terminal 300. The following descriptions will focus upon the differences from Embodiment 3.

1. Configuration

Figure 18:
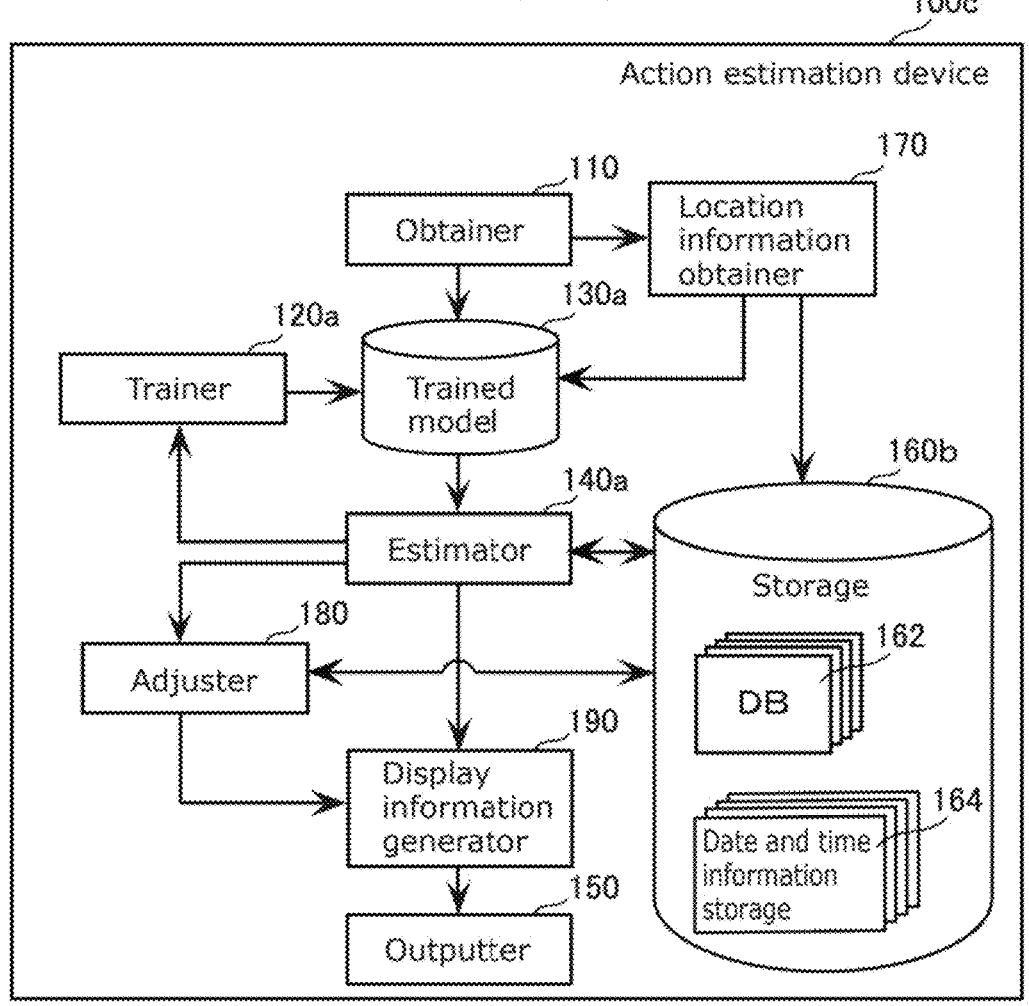
FIG. 18 is a block diagram illustrating an example of the configuration of an action estimation device according to Embodiment 4.

FIG. 18 is a block diagram illustrating an example of the configuration of action estimation device 100*c* according to Embodiment 4. As illustrated in FIG. 18, Embodiment 4 differs from Embodiment 3 in that action estimation device 100*c* includes display information generator 190.

Display Information Generator

Display information generator 190 generates the display information, for example, by superimposing information in which at least one of operation information pertaining to an operation of sound collector 200 or action information of a person estimated based on the sound information pertaining to the inaudible sound collected by sound collector 200 is superimposed on layout information indicating a layout of a plurality of rooms in a building in which sound collector 200 is installed and which room among the plurality of rooms sound collector 200 is installed in. Additionally, for example, display information generator 190 may change the information included in the display information and the display format based on instruction information input to external terminal 300 by a user. For example, if adjuster 180 has adjusted the sound collection frequency of sound collector 200, display information generator 190 may generate display information that displays the sound collection efficiency at the pre-adjustment sound collection frequency and a predicted value of the sound collection efficiency at the post-adjustment sound collection frequency.

Outputter

In Embodiment 4, outputter 150 further outputs the display information generated by display information generator 190 to external terminal 300.

2. Operations

Figure 19:
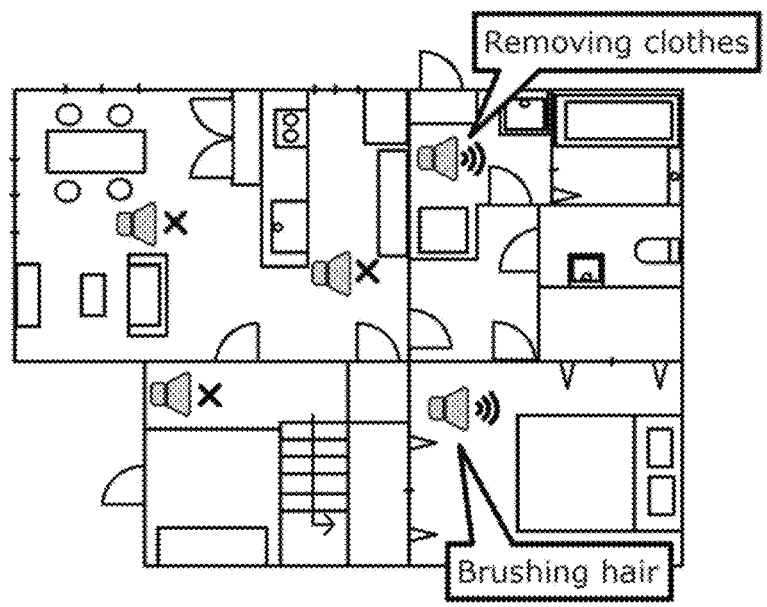
FIG. 19 is a diagram illustrating an example of display information.

Operations of action estimation device 100*c* according to Embodiment 4 will be described next with reference to FIGS. 18 and 19. An example of operations for generating the display information and outputting the display information will be described here. FIG. 19 is a diagram illustrating an example of the display information.

When an action of a person is estimated by estimator 140*a*, display information generator 190 obtains the estimated action information. Then, display information generator 190 generates the display information, for example, by superimposing information in which at least one of operation information pertaining to an operation of sound collector 200 or action information of a person estimated based on the sound information pertaining to the inaudible sound collected by sound collector 200 is superimposed on layout information indicating a layout of a plurality of rooms in a building in which sound collector 200 is installed and which room among the plurality of rooms sound collector 200 is installed in. As illustrated in FIG. 19, the operation information indicates that sound collector 200 is not operating if an x appears next to a mark indicating a speaker, and that sound collector 200 is operating if a waveform appears next to the mark indicating a speaker. "Operating" means collecting sound, The person's action information may, for example, be displayed next to the speaker mark of sound collector 200 that collected the inaudible sound, or, for example, the action information may be displayed when the user touches the speaker mark. Furthermore, in addition to the person's action information, time information such as the time at which the action was estimated by action estimation device 100*c* or the time at which the person took the action may also be displayed.

In this manner, action estimation device 100*c* according to Embodiment 4 outputs display information including the obtained information and the derived information to external terminal 300, and thus the user can display and confirm the display information is a display (not shown) of external terminal 300.

3. Effects, etc.

As described thus far, action estimation device 100*c* further includes display information generator 190 that generates display information in which at least one of operation information pertaining to an operation of sound collector 200 or the action information of the person estimated based on the sound information pertaining to the inaudible sound collected by sound collector 200 is superimposed on layout information indicating a layout of a plurality of rooms in a building in which sound collector 200 is installed and which room among the plurality of rooms sound collector 200, and outputter 150 further outputs the display information generated by display information generator 190 to external terminal 300.

This action estimation device 100c outputs the display information for display to external terminal 300, and thus when action information is estimated, the user can confirm the information through external terminal 300.

Other Embodiments

Although an action estimation device and an action estimation method according to one or more aspects of the present disclosure have been described thus far based on embodiments, the present disclosure is not intended to be limited to these embodiments. Variations on the present embodiment conceived by one skilled in the art, embodiments implemented by combining constituent elements from different other embodiments, and the like may be included in the scope of one or more aspects of the present disclosure as well, as long as they do not depart from the essential spirit of the present disclosure.

For example, some or all of the constituent elements included in the action estimation device according to the foregoing embodiments may be implemented by a single integrated circuit through system LSI (Large-Scale Integration). For example, the action estimation device may be constituted by a system LSI circuit including an obtainer, a trainer, a trained model, an estimator, and an outputter. Note that the system LSI circuit need not include the trainer.

"System LSI" refers to very-large-scale integration in which multiple constituent elements are integrated on a single chip, and specifically, refers to a computer system configured including a microprocessor, read-only memory (ROM), random access memory (RAM), and the like. A computer program is stored in the ROM. The system LSI circuit realizes the functions of the devices by the microprocessor operating in accordance with the computer program.

Note that although the term "system LSI" is used here, other names, such as IC, LSI, super LSI, ultra LSI, and so on may be used, depending on the level of integration, Further, the manner in which the circuit integration is achieved is not limited to LSIs, and it is also possible to use a dedicated circuit or a general purpose processor. It is also possible to employ a Field Programmable Gate Array (FPGA) which is programmable after the LSI circuit has been manufactured, or a reconfigurable processor in which the connections and settings of the circuit cells within the LSI circuit can be reconfigured, Further, if other technologies that improve upon or are derived from semiconductor technology enable integration technology to replace LSI circuits, then naturally it is also possible to integrate the function blocks using that technology. Biotechnology applications are one such foreseeable example.

Additionally, rather than such an action estimation device, one aspect of the present disclosure may be an action estimation method that implements the characteristic constituent elements included in the action estimation device as steps. Additionally, aspects of the present disclosure may be realized as a computer program that causes a computer to execute the characteristic steps included in such an action estimation method. Furthermore, aspects of the present disclosure may be realized as a computer-readable non-transitory recording medium in which such a computer program is recorded.

INDUSTRIAL APPLICABILITY

According to the present disclosure, the actions of a person can be estimated based on inaudible sounds, and more types of behavior can therefore be estimated while protecting privacy. As such, the present disclosure can be used in various locations such as residences, workplaces, schools, commercial facilities, or the like.

The invention claimed is:

1. An action estimation device comprising:
    an obtainer that obtains sound information pertaining to an inaudible sound, the inaudible sound being a sound in an ultrasonic band collected by a sound collector;
    an estimator that estimates an output result, obtained by inputting the sound information obtained by the obtainer into a trained model indicating a relationship between the sound information and action information pertaining to an action of a person, as the action information of the person;
    a display information generator that generates display information in which the action information of the person estimated based on the sound information pertaining to the inaudible sound collected by the sound collector is superimposed on layout information indicating a layout of a plurality of rooms in a building in which the sound collector is installed and which room among the plurality of rooms the sound collector is installed in; and
    an outputter that outputs the display information generated by the display information generator to an external terminal.

2. The action estimation device according to claim 1, wherein the sound information input to the trained model includes at least one of a frequency band of the inaudible sound, a duration of the inaudible sound, a sound pressure of the inaudible sound, or a waveform of the inaudible sound.

3. The action estimation device according to claim 1, wherein a form of the sound information input to the trained model is time-series numerical data of the inaudible sound, an image of a spectrogram, or an image of frequency characteristics.

4. The action estimation device according to claim 1, further comprising:
    a date and time information recorder that records date and time information pertaining to a date and time at which the inaudible sound is collected by the sound collector; and
    an adjuster that adjusts a sound collection frequency of the sound collector by weighting the sound collection frequency of the sound collector based on a number of times the action information of the person is estimated by the estimator and the date and time information recorded by the date and time information recorder;
    wherein the outputter further outputs, to the sound collector, information pertaining to the sound collection frequency adjusted by the adjuster.

5. The action estimation device according to claim 1, further comprising:
- a location information obtainer that obtains location information pertaining to a location of a sound source of the inaudible sound,
- wherein the estimator estimates the output result, obtained by inputting both the sound information and the location information obtained by the location information obtainer into the trained model, as the action information of the person.

6. The action estimation device according to claim 5, wherein the location information obtainer obtains, as the location information, the location of the sound source derived based on an installation location of the sound collector that collects the inaudible sound.

7. The action estimation device according to claim 5, wherein the location information obtainer further obtains, as the location information, the location of the sound source derived based on sound information pertaining to an inaudible sound produced by an object having an installation location that does not change, the sound information being obtained by the obtainer.

8. The action estimation device according to claim 5, wherein the location information obtainer obtains, as the location information, the location of the sound source derived from a direction of the sound source, the direction being identified based on a directivity of the inaudible sound collected by at least two of the sound collectors.

9. The action estimation device according to claim 5, further comprising:
- a database that stores the location information of the sound source and the sound information pertaining to the inaudible sound produced by the sound source in association with the action information of the person,
- wherein the estimator further estimates the action information of the person by determining whether the output result of the trained model is probable based on the database.

10. An action estimation method comprising:
- obtaining sound information pertaining to an inaudible sound, the inaudible sound being a sound in an ultrasonic band collected by a sound collector;
- estimating an output result, obtained by inputting the sound information obtained in the obtaining into a trained model indicating a relationship between the sound information and action information pertaining to an action of a person, as the action information of the person;
- generating display information in which the action information of the person estimated based on the sound information pertaining to the inaudible sound collected by the sound collector is superimposed on layout information indicating a layout of a plurality of rooms in a building in which the sound collector is installed and which room among the plurality of rooms the sound collector is installed in; and
- outputting the display information generated in the generating to an external terminal.

11. A non-transitory computer-readable recording medium having recorded thereon a program for causing a computer to execute the action estimation method according to claim 10.

* * * * *